(12) United States Patent
Schröder

(10) Patent No.: US 6,374,055 B1
(45) Date of Patent: Apr. 16, 2002

(54) COUNTING DEVICE PREFERABLY PICTURE COUNTING DEVICE FOR A CAMERA AND CAMERA WITH PICTURE COUNTING DEVICE

(75) Inventor: Rolf Schröder, Zorneding (DE)

(73) Assignee: Agfa-Gevaert N.V. (BE)

( * ) Notice: Subject to any disclaimer, the term of this patent is extended or adjusted under 35 U.S.C. 154(b) by 0 days.

(21) Appl. No.: 09/482,404

(22) Filed: Jan. 12, 2000

(30) Foreign Application Priority Data

Jan. 16, 1999 (DE) .......................................... 199 01 576

(51) Int. Cl.⁷ .............................................. G03B 17/36
(52) U.S. Cl. ...................................................... 396/284
(58) Field of Search ................................. 396/411, 387, 396/176, 284, 439, 6; 235/108, 111, 116, 119, 103; 254/217

(56) References Cited

U.S. PATENT DOCUMENTS

| | | | | |
|---|---|---|---|---|
| 4,821,059 A | * | 4/1989 | Nakanishi et al. ............. 396/75 |
| 4,896,180 A | * | 1/1990 | Lawther ...................... 396/387 |
| 5,436,685 A | * | 7/1995 | Yamashina .................. 396/439 |
| 5,758,197 A | * | 5/1998 | Cipolla et al. ............... 396/284 |
| 5,890,022 A | * | 3/1999 | Petruchik et al. ............ 396/176 |
| 5,897,222 A | * | 4/1999 | Cipolla .......................... 396/6 |
| 5,988,893 A | * | 11/1999 | Shroder et al. ............. 396/411 |

FOREIGN PATENT DOCUMENTS

DE       1093661 B1  *  7/1959

* cited by examiner

*Primary Examiner*—David M. Gray
(74) *Attorney, Agent, or Firm*—Connolly Bove Lodge & Hutz LLP

(57) ABSTRACT

A counting device, in particular a picture counting device for a camera, comprises a counting mark carrier (401) which forms a first assembly and has a plurality of counting marks disposed in a ring shape and an indicating device (415) which forms a second assembly and interacts with counting marks of the counting mark carrier, one of the assemblies being displaceable relative to the other assembly by a control device (114) to set a respective counter position and the assembly (401) displaceable relative to the other assembly being rotatable and displaceable parallel to a plane of rotation of said displaceable assembly (401) by the control device (114). Preferably, the rotatable and displaceable assembly contains the counting mark carrier (401).

26 Claims, 22 Drawing Sheets

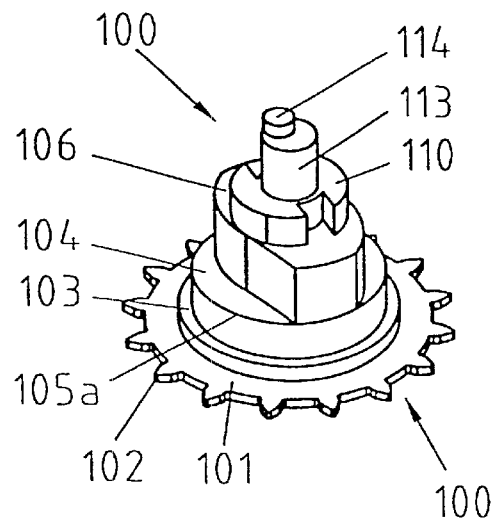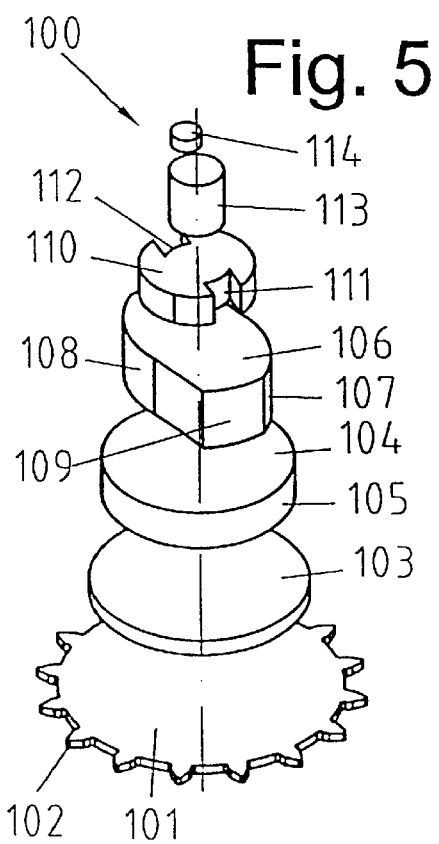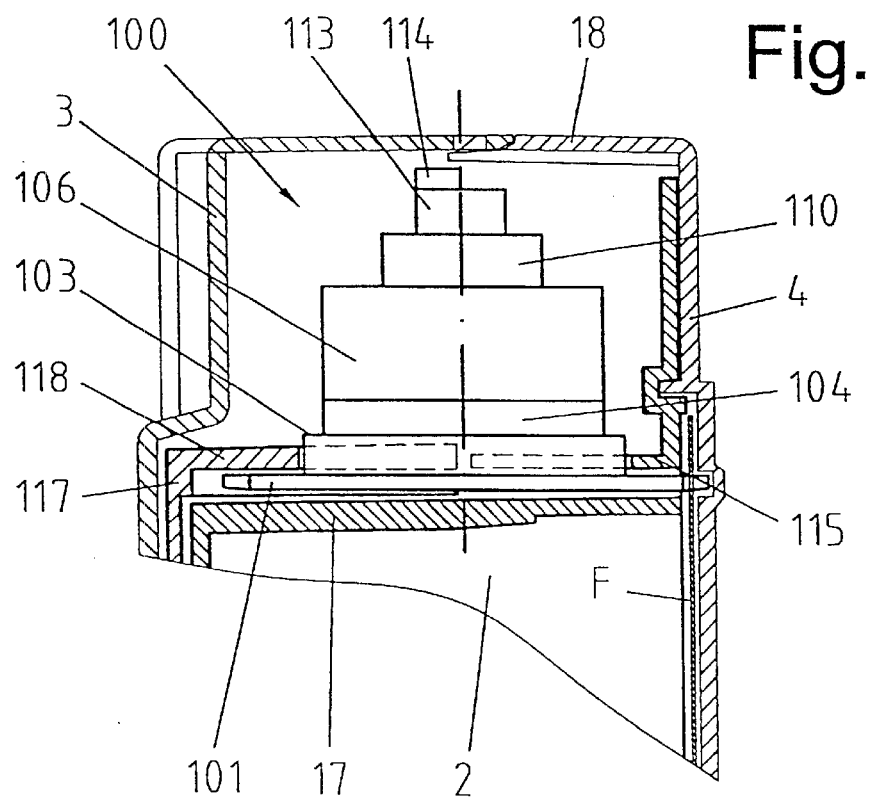

COUNTING DEVICE PREFERABLY PICTURE COUNTING DEVICE FOR A CAMERA AND CAMERA WITH PICTURE COUNTING DEVICE

BACKGROUND OF THE INVENTION

The invention relates to a counting device, in particular a picture counting device for a camera, having the features of the preamble of claim 1 and also to a camera having a picture counting device.

In cameras which are fitted with a mechanical picture counting device, a counting mark carrier in the form of a picture counting disc or picture counting drum is normally provided which can be rotated around an axis and which has a plurality of picture numbers or other picture counting marks which become visible consecutively in a viewing window of the camera casing each time the film is wound on by one frame. In this connection, the counting mark carrier is turned on by one counting mark by means of a ratchet mechanism every time the film is wound on by one frame in order, in this way, to indicate, in the case of upward counting, the number of pictures already taken or, in the case of downward counting, to indicate the number of pictures which can still be taken before the capacity of the film loaded into the camera is exhausted in each case. Such ratchet mechanisms require a comparatively expensive and bulky construction and are therefore less suitable, in particular, for an automatic assembly of the counting device, as a result of which an automatic assembly, for example, of a camera containing such a counting device is also made more difficult.

The object of the invention is therefore to create a counting device and, in particular a picture counting device of the type mentioned at the outset, which is suitable for a camera and which makes possible a space-saving construction and a simple assembly. Furthermore, the object of the invention is to create a camera having a picture counting device which makes possible a space-saving construction and a simple assembly in regard to the picture counting device.

BRIEF DESCRIPTION OF THE DRAWINGS

Preferred embodiments of the counting device according to the invention, preferably designed as a picture counting device of a camera, and also a camera according to the invention are described below in greater detail with reference to the drawings.

In the drawings:

FIG. 4 shows a perforation wheel assembly, contained in the camera in accordance with FIGS. 1 to 3, in a separate and enlarged view, FIG. 5 shows the perforation wheel assembly in accordance with FIG. 4 in an "exploded view", FIG. 6 shows the perforation wheel assembly in accordance with FIG. 4 in side view when inserted in the camera casing and parts of the camera casing in section.

DETAILED DESCRIPTION OF THE INVENTION

Several embodiments of the invention are described in detail below in conjunction with the drawings. In this connection, reference symbols contained in the individual figures of the drawings for designating respective parts of the embodiments shown also apply analogously to the corresponding designation of identical or similar parts in other figures if such parts are not provided with reference symbols.

Type of photographic camera

The photographic still-picture camera described in greater detail below is preferably a disposable camera which is fitted with a film by the manufacturer and which is designed to use a roll film of the "135" system. The latter is a 35 mm film which has, at both edges, an edge perforation, each of which is formed by perforation holes continuously disposed at a constant mutual distance in each case. The invention is, however, also applicable in the same manner to reusable cameras which are first loaded with film by the user in a known manner. Instead of 35 mm film, the camera can also be equipped for other recording media which are designed in strip form and which have a continuous perforation at least at one of the two edges.

Structure of the camera

Figure 1:
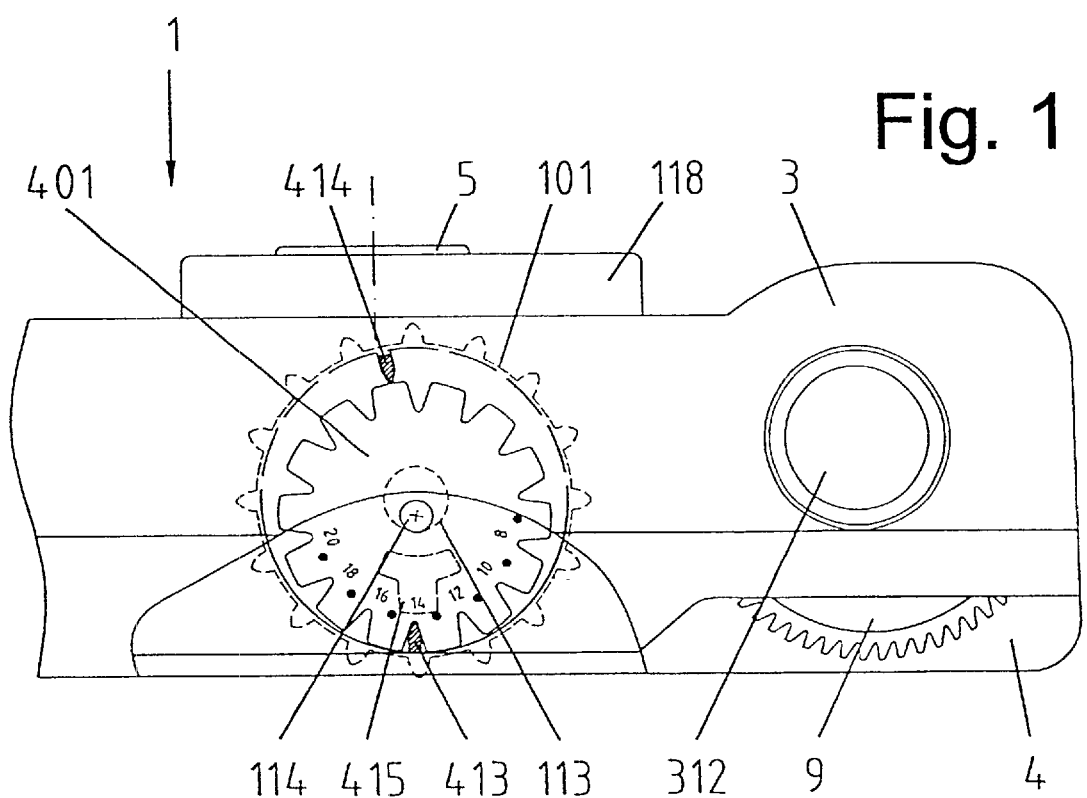
FIG. 1 shows a camera according to the invention in plan view with the casing shells partly cut away.
Figure 2:
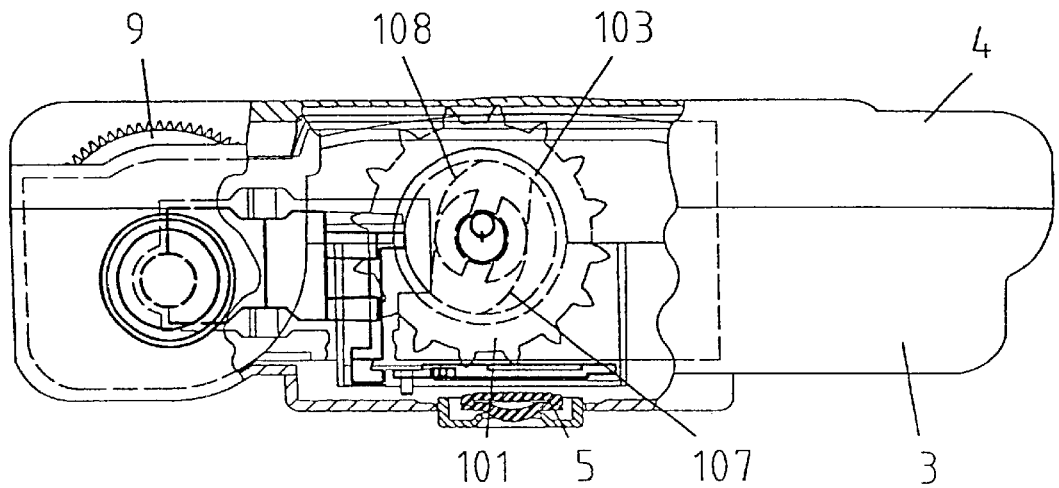
FIG. 2 shows a different view of the camera in accordance with FIG. 1, likewise in plan.
Figure 3:
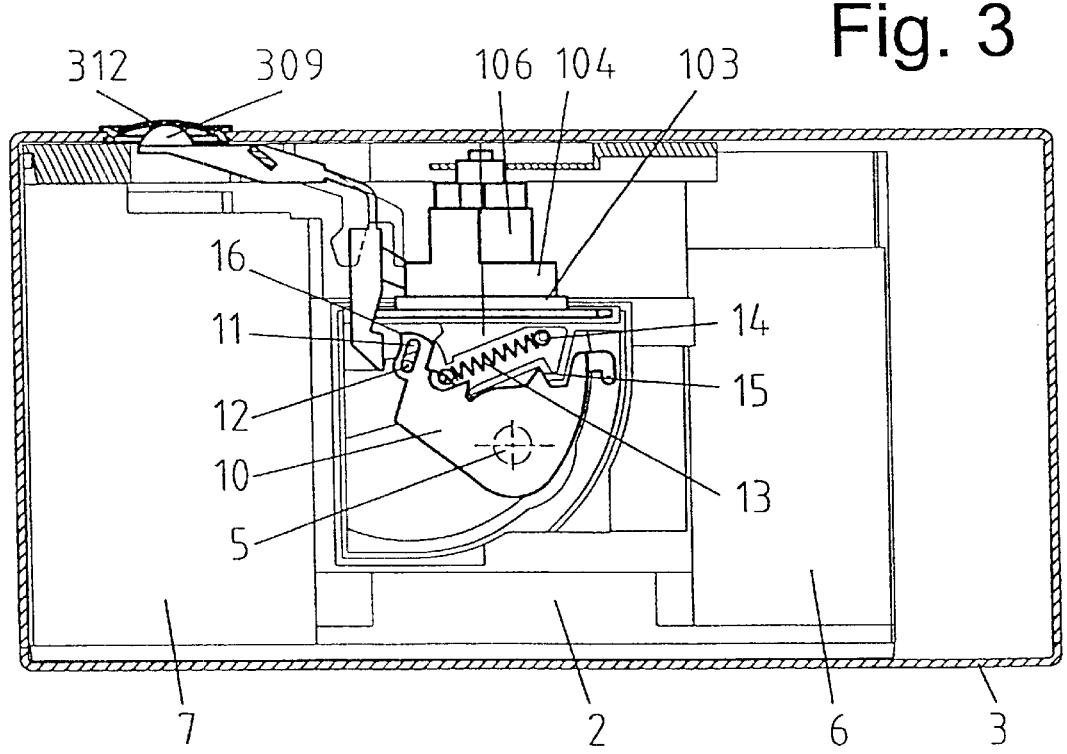
FIG. 3 shows the camera in accordance with FIG. 2 in the front view with the front casing shell removed.

FIGS. 1 to 3, in particular, show, in a simplified view, the basic structure of an exemplary embodiment of a camera for 35 mm roll film. Said camera 1 comprises a core assembly 2 which is disposed between a front casing shell 3 and a rear casing shell 4, a film F loaded into the camera being indicated only in FIG. 6. Between the core assembly 2 and the rear casing shell 4 there is a light-tight joint. At the front of the camera, there is a photographing lens 5 for optically recording still pictures on each film loaded into the camera.

The core assembly 2 contains a receiving chamber 6 for receiving a loose film supply spool, which is not shown, and a receiving chamber 7 for receiving a film cassette, likewise not shown, which can be loaded into the camera and also a film guide device and a film winding device for guiding the film during picture-to-picture winding from the film supply spool to the film cassette. Of the film winding device, only the knurled film winding wheel 9 is shown which projects outwards through a slot 8, shown for example in FIG. 25, in the rear casing shell 4 and which is joined to a take-up spool of the film cassette in a manner known per se and not shown in greater detail and which can be actuated manually by the camera user to carry out the film winding, and specifically by counterclockwise rotation in the view in accordance with FIG. 1.

As FIG. 3 shows, there is a photographic shutter for picturewise exposure of the film in the beam path of the lens in the camera casing. Said shutter preferably has only a single shutter blade 10 which is mounted rotatably on a bearing pin 12, fixed to the casing, by means of an elongated hole 11 and is subject to the action of a spring element, preferably a tension spring 13, which is attached by its one end to the shutter blade 10 and by its other end to a pin 14 fixed to the casing and which pulls the shutter blade 10 against a stop 15 fixed to the casing. The shutter blade 10 has a lug-type projecting actuating stop 16 for actuating the shutter blade 10 in a manner described in greater detail below. In the unreleased state, the shutter blade 10 assumes the position in accordance with FIG. 3 and, under these circumstances, prevents the light passing through the lens 5 from striking that section of the photographic film loaded into the camera which is disposed in each case on the axis of the lens near the rear wall of the camera.

The camera described above furthermore comprises the following assemblies:

- a sprocket wheel assembly 100 which forms a film metering device,
- a winding mechanism locking device 200 controlled by the rotation of the sprocket wheel assembly 100 for locking the film winding device every time the film has been wound on by one frame,
- a device 300 for releasing and operating the photographic shutter and for unlocking the film winding device after every shutter release, and also
- a picture counting device 400 controlled by the sprocket wheel assembly for counting and indicating the number of pictures which, in the case of forward counting, have already been taken on the photographic film loaded into the camera or, in the case of downward counting, can still be taken on said film.

To mount said assemblies, the camera casing contains a central partition 17 belonging to the core assembly and an upper partition 18, which are mutually parallel.

The above-mentioned assemblies and their interaction are described in greater detail below.

Sprocket wheel assembly

The sprocket wheel assembly 100 serves as a film metering device ("metering means") and, for this purpose, interacts with the film contained in the camera in such a way that the sprocket wheel assembly rotates around an axis in the camera during the winding of the film. The sprocket wheel assembly 100 serves furthermore to control the locking movement of the winding mechanism locking device 200, to control the resetting movement of the shutter release device 300 from a terminal position after shutter release to a standby position for a subsequent shutter release with simultaneous tensioning of an energy storage spring of the winding mechanism locking device 200 and also for driving the picture counting device 400.

As is evident, from FIGS. 3 to 6 in particular, the sprocket wheel assembly 100 is disposed between an upper wall 17 of the core assembly 2 of the camera and an upper casing wall 18 formed by the two casing shells 3, 4 and is rotatably mounted in a manner described in greater detail below. The sprocket wheel assembly 100 comprises a film sprocket wheel 101 which projects by means of rim teeth 102 into the film winding path and engages with said teeth 102 in a manner known per se and therefore not shown in one of the rim perforations provided on the film, as a result of which, when the film is wound on, it is carried along by the latter and set in rotation. In the exemplary embodiment shown, the circumference of the film sprocket wheel 101 is dimensioned in such a way that, every time the film is wound on by one frame, it carries out a rotation through 180° around a central axis of the film sprocket wheel. In addition, the following additional components also belong to the sprocket wheel assembly 100.

Immediately above the film sprocket wheel 101, there is a bearing collar 103 which serves the radial bearing of the film sprocket wheel 101. Above the bearing collar 103, there is a cylindrical piece 104 with a circumferential cylindrical surface 105.

Immediately above the cylindrical piece 104, there is a cam piece 106 having first and second cam faces 107, 108 which are mutually offset by 180°, and which each increase spirally in cross section from a region near the axis up to a respective outer concentric region, the outer concentric regions 109 of the cam faces 107, 108 forming cylindrical component faces which have the same radius as the circumferential cylindrical face 105 of the cylindrical piece 104. The cylindrical piece 104 and the cam piece 106 with its cam faces together form a control element 104, 106. Upper edge sections of the cylindrical surface 105 each form sharp edges 105a for the device 300 for the purpose of releasing and actuating the photographic shutter and the first and second cam faces 107, 108 of the cam piece 106 each serve to reset, in the course of a subsequent winding-on of film by one frame, the device 300 for releasing and actuating the photographic shutter after shutter release has taken place to a starting position in a continuous transition and simultaneously to tension an elastic element of the winding mechanism locking device 200 continuously, which is described in greater detail below.

Above the cam piece 106, there is a cylindrical grooved disc 110 which has, at its circumference, two grooves 111, 112 mutually offset by 180° and directed radially inwards and a control device for controlling the winding mechanism locking device 200 described in greater detail below, for locking the film winding device.

Immediately above the grooved disc 110, there is a spindle end 113 which likewise serves to mount the sprocket wheel assembly 100 rotatably and carries an eccentric pin 114 which is disposed eccentrically at a terminal end face and which is provided to drive the picture counting device 400, which is not shown in FIGS. 2 to 8 and is described in greater detail below by reference to FIG. 25 and subsequent figures.

The components 103, 104, 106, 110 and 113, described above, of the sprocket wheel assembly 100 are disposed coaxially with respect to the film sprocket wheel 101 and participate in the rotational movement of the film sprocket wheel 101. As especially FIG. 4 shows, the entire sprocket wheel assembly 100 may preferably be designed integrally and comprise a single plastics-material moulded part. As a result, the sprocket wheel assembly 100 can be produced very inexpensively when manufactured on a large scale and is associated with the further advantage that the various components not only each have a high dimensional accuracy on their own, but also in the spatial coordination with respect to the other components in each case.

Figure 7:
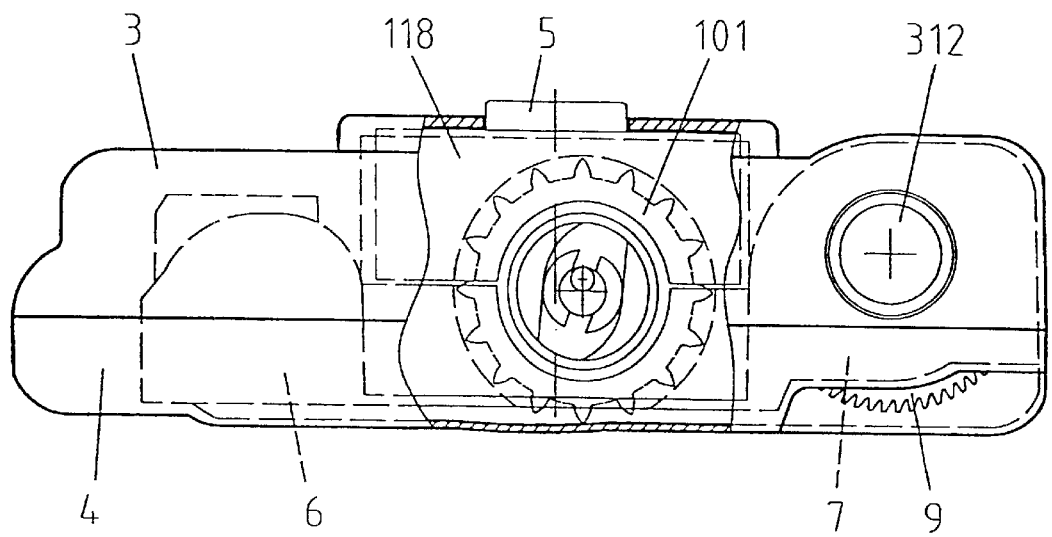
FIG. 7 shows the subject matter of FIG. 6 in plan view.
Figure 8:
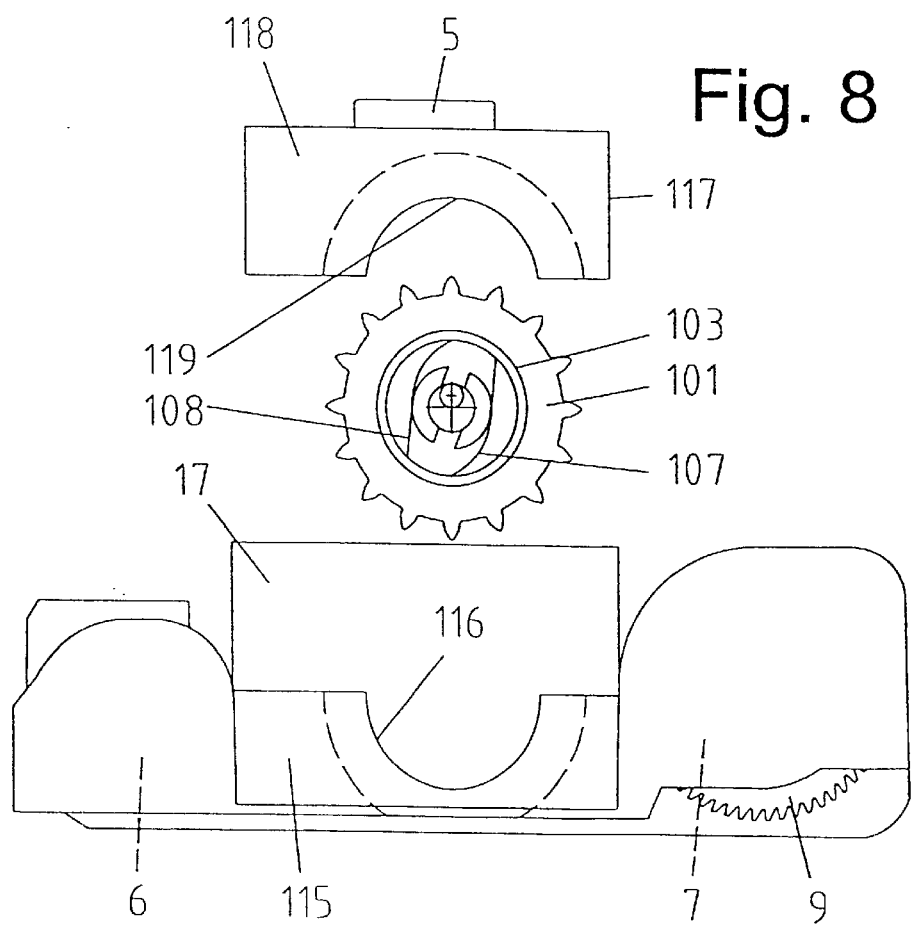
FIG. 8 shows parts of the subject matter of FIG. 7 in an "exploded view"

The fitting of the sprocket wheel group 100 into the casing of the camera and the rotatable mounting of the sprocket wheel assembly 100 in the camera casing are now described in greater detail with reference to FIGS. 6 to 8.

Above the upper wall 17 of the core assembly 2 of the camera casing, there is situated at a comparatively small distance a first guide plate 115 which is fixed to the casing and which is disposed near the rear casing shell 4 and extends inwards by means of a lower part perpendicular to said rear casing shell 4. The guide plate 115 has a semicircular recess 116. Present at an assembly 117 which contains the photographic lens 5 and which is also denoted below as lens carrier and can be attached to the core assembly 2 from the front is a second guide plate 118 which, with the lens carrier 117 attached, lies in the same plane as the first guide plate 115 and likewise has a semicircular recess 119 which, with the lens carrier 117 attached, is mirror-inverted in relation to the semicircular recess 116 of the first guide plate 115. With the lens carrier 117 attached, the two recesses 116, 119 of the first and second guide plates 115, 118 form a circular opening whose inside diameter is slightly greater than the diameter of the bearing collar 103 of the sprocket wheel assembly 100. The distance of the lower faces of the first and second guide plates 115, 118 above the upper wall 17 of the core assembly 2 is dimensioned so that the film sprocket wheel 101 of the sprocket wheel assembly 100 can extend into the gap between the upper wall 17 of the core assembly 2 and the first or second guide plate 115, 118, respectively, and can rotate therein without fairly large friction. At the same time, the bearing collar 103 of the sprocket wheel assembly 100 is situated in the opening formed by the recesses 116, 119 of the first and second guide plates 115, 118 and undergo a radial bearing there so that the sprocket wheel assembly 100 is guided by said opening with its bearing collar 103 when it rotates around the central axis.

When the camera is assembled, the sprocket wheel assembly 100 is inserted in such a way that, with the lens carrier 117 not yet attached, the sprocket wheel assembly 100 is inserted with its film sprocket wheel 101 below the guide plate 115 until the bearing collar 103 of the sprocket wheel assembly 100 comes up against the recess 116 of the guide plate 115. Then the lens carrier 117 is attached to the core assembly 2 from the front, in which process the second guide plate 118 is pushed over the film sprocket wheel 101 of the sprocket wheel assembly 100 until the opening formed by the recesses 116, 119 of the first and second guide plates 115, 118 form a closed circular contour. As a result, the film sprocket wheel 101 and, together with it, the entire sprocket wheel assembly 100 acquires a bearing in the axial and radial direction, under which circumstances a low-friction rotation of the sprocket wheel assembly 100 around its central axis is made possible in said axial and radial bearing. After the lens carrier 117 has been attached to the core assembly 2, the front casing shell 3 is attached and partly covers the lens carrier 117, which is visible, in particular, in FIG. 6.

The sprocket wheel assembly 100 can consequently be inserted in the camera by simple plug-in operations, which promotes an automatic assembly of the camera. If, as a departure from the embodiment described above, the film sprocket wheel 101 is designed in such a way that, when the film is wound on by one frame, it executes not a half revolution (rotation through 180°), but a full revolution (rotation through 360°), the cam piece 106 is modified so that it does not have two cam faces 107, 108, but only a single cam face which extends over a large section of the circumference of the cam piece 106. Furthermore, in this modification, the grooved disc 110 does not have two grooves 111, 112, but only a single groove.

Whereas, in the embodiment described above, the sprocket wheel assembly 100 is rotated by the film sprocket wheel 101 being driven by the film while it is being wound on by the film sprocket wheel 9, as a departure from this, an intermediate mechanism, not shown in the drawings, may also be provided between the film winding wheel 9 and the sprocket wheel assembly 100 so that the sprocket wheel assembly is driven via the intermediate mechanism. In this modification, a friction clutch is then expediently provided between the film winding wheel 9 and the film take-up spool of the film cassette loaded in the camera.

The embodiments described above for the sprocket wheel assembly 100 are examples of the embodiment of a general teaching, according to which, in the case of a camera for edge-perforated film having a film winding device 9 and a rotatably mounted film sprocket wheel 101 which engages by means of teeth 102 in the edge perforation of the film and executes a rotary movement during film winding, the film sprocket wheel 101 is up against one bearing face 17 of a casing part 2 by means of one side and has, on the other side, a coaxial bearing collar 103 which is disposed rotatably in a bearing opening of a casing part. Preferably, under these circumstances, the film sprocket wheel 101 and the bearing collar 103 are designed integrally.

The film sprocket wheel 101 is able to engage by means of its outer rim region into a circumferential gap between casing parts, the gap preferably being formed between the bearing surface 17 and the plate 115, 118 disposed above it. This may form a circular bearing opening in which the bearing collar 103 of the sprocket wheel 101 is radially mounted and may be formed by first and second subplates 115, 118 having semicircular recesses 116, 119 which are disposed symmetrically with respect to one another and which jointly form the bearing opening for the bearing collar 103 of the film sprocket wheel 101.

During the assembly of the camera, the film sprocket wheel 101 can be plugged into a gap bounded by the first subplate 115 and the second subplate 118 can then be brought up to the first subplate 115. The first subplate 115 may be formed by a casing part and the second subplate 118 by a lens carrier 117 which can be attached to a casing part.

The film sprocket wheel 101 may be joined to a control device 110 for controlling the film winding mechanism locking device 200, said control device preferably comprising a grooved disc 110 which is joined to the film sprocket wheel 101 and which is up against a locking lever 201 of the winding mechanism locking device 200. The grooved disc 110 has at least one groove 111, 112 in which a pawl 205 of the locking lever 201 of the winding mechanism locking device 200 can engage.

Furthermore, the film sprocket wheel 101 may be joined to a control device 104, 106 for controlling the shutter release device 300. Said control device can control the operating sequence of a shutter actuating element 317 and transfer the shutter release device 300 after releasing a photographic shutter of the camera from a terminal position to a standby position for once again releasing the shutter. The control device 104, 106 may have at least one cam face 107, 108 which increases outwards in cross section and up against which there may be at least one contact element 318, 321 of the shutter release device 300. Preferably, up against the at least one cam face 107, 108 of the control device 104, 106 there may be both a contact element 318 of the shutter release device for controlling the operating sequence of a shutter actuating element 317 and a further contact element 321 of the shutter release device 300 for controlling its return from the terminal position to the release standby position.

The at least one cam face 107, 108 of the control device 104, 106 for controlling the shutter release device 300 occupies a predetermined angular position in relation to a control device 110 for controlling the winding mechanism locking device 200, preferably in such a way that at least one rebound of the cam face 107, 108 of the control device 104, 106 is offset slightly in terms of angle in relation to at least one groove 111, 112 of the control device designed as a grooved disc 110 for the winding mechanism locking device 200.

The film sprocket wheel 101 may be joined to a control device 114 for a picture counting device 400 of the camera. Preferably, said control device has an eccentric 114 which interacts with a picture counting disc 401 of the picture counting device 400.

The film sprocket wheel 101 and at least one control device for controlling the winding mechanism locking device 200, the shutter release device 300 and/or the picture counting device 400 may form a sprocket wheel assembly 100 which may be formed integrally from plastics material.

Winding mechanism locking device

The winding mechanism locking device 200 serves to lock the film winding device every time the film is wound on by one frame and is then unlocked again when the photographic shutter of the camera is released. The winding mechanism locking device 200 therefore interacts with the sprocket wheel assembly 100, the film winding wheel 9 and the shutter release device 300. In addition, influencing of the winding mechanism locking device 200 may also be provided by the picture counting device 400.

Figure 9:
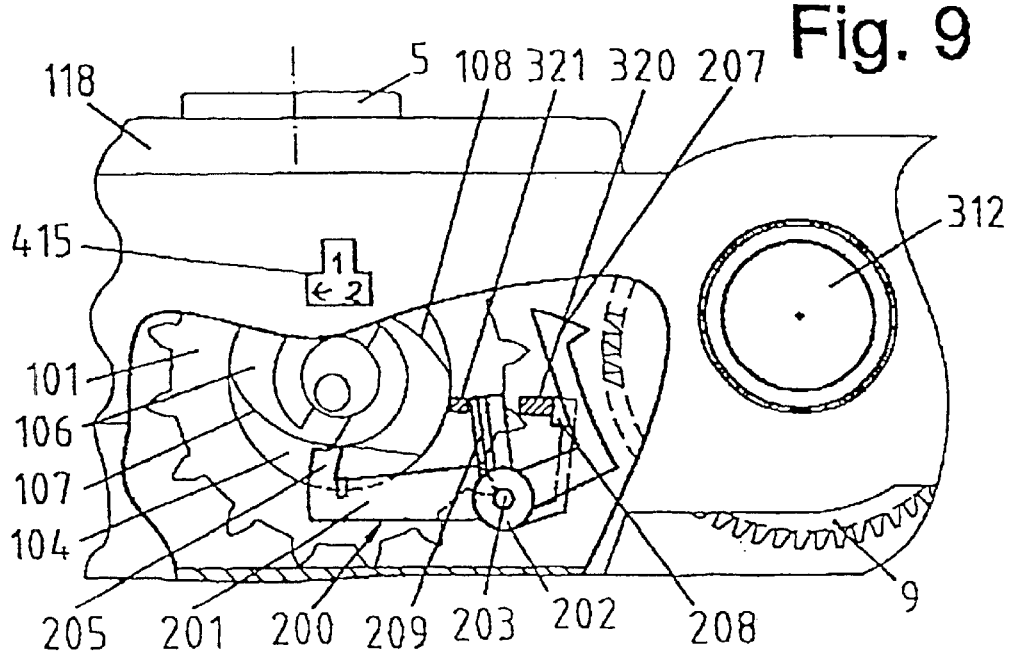
FIG. 9 shows a winding mechanism locking device contained in the camera in accordance with FIGS. 1 to 8 in plan view and parts of a device, interacting therewith, for releasing and actuating a photographic shutter of the camera in section in a position which does not lock the film winding mechanism.
Figure 10:
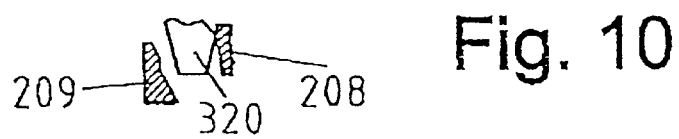
FIG. 10 shows parts of the subject matter of FIG. 9, partly in section, partly in elevation.
Figure 11:
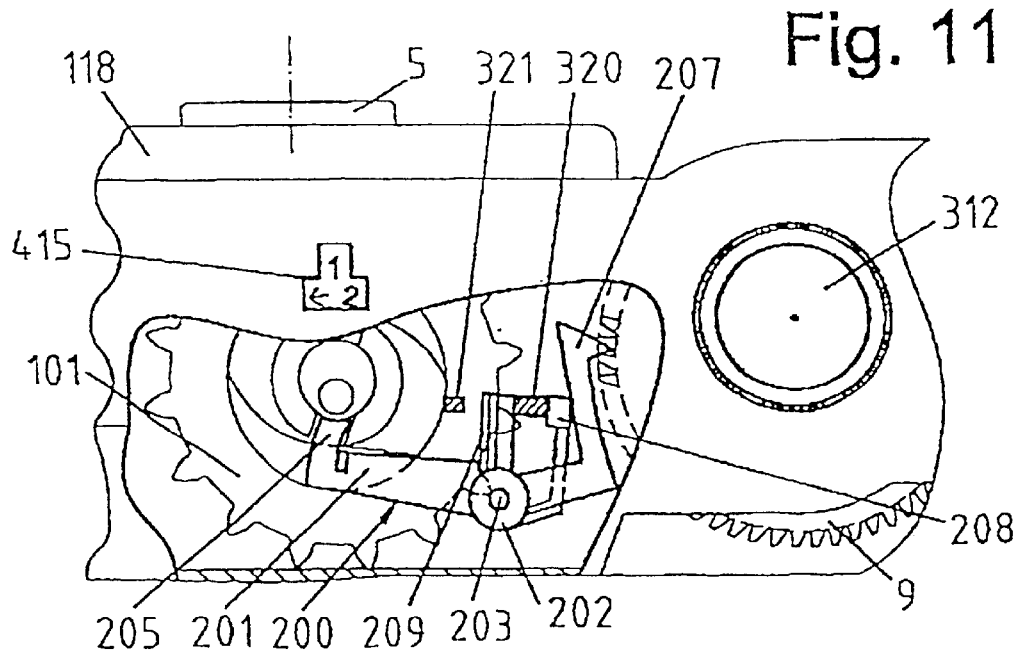
FIG. 11 shows the subject matter of FIG. 9 in a position which locks the film winding mechanism.
Figure 12:
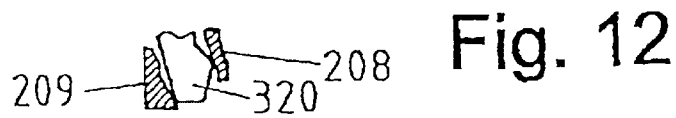
FIG. 12 shows the subject matter of FIG. 11, partly in section, partly in elevation.
Figure 13:
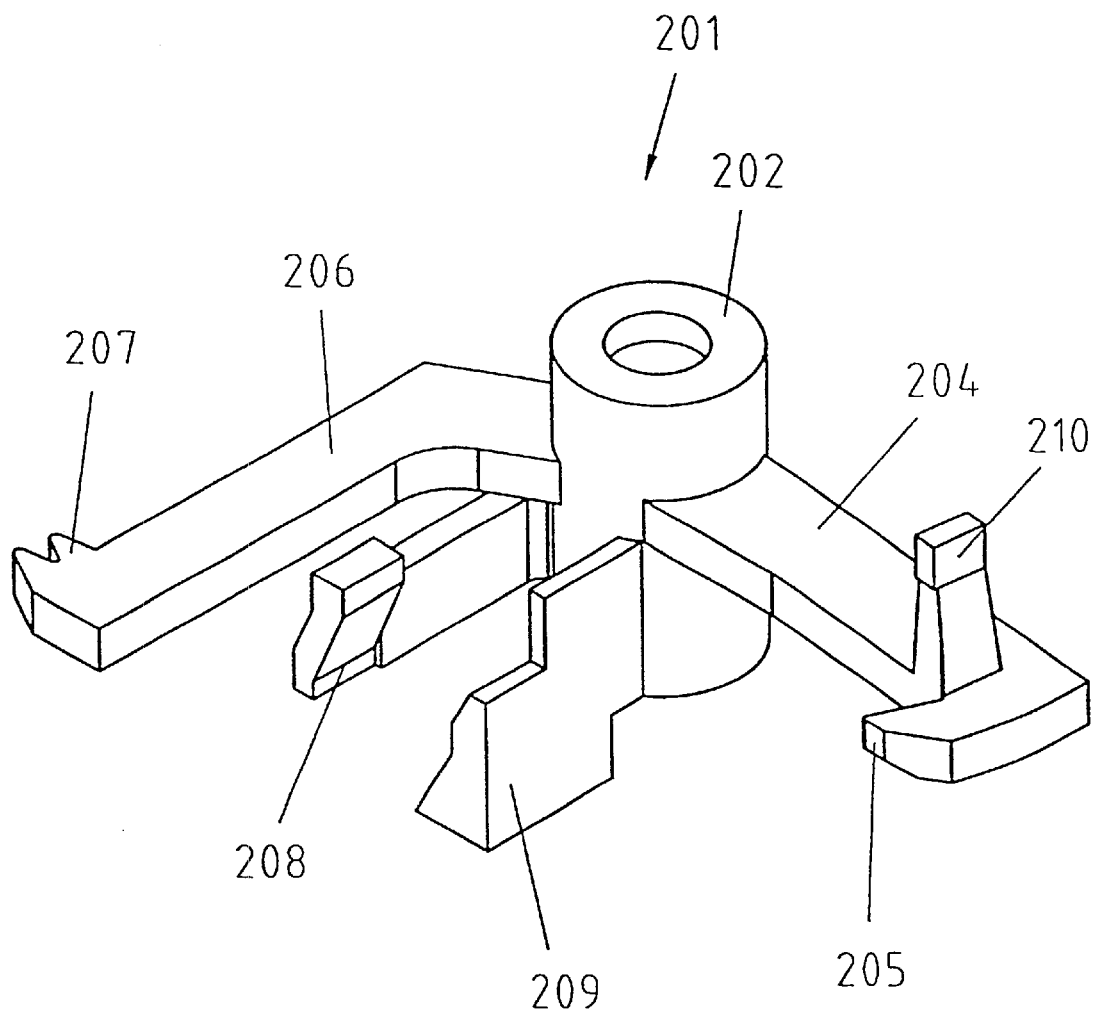
FIG. 13 shows a locking lever of the winding mechanism locking device in accordance with FIGS. 9 to 12 in a perspective view as seen in the direction away from the front shell of the casing.

The winding mechanism locking device 200 is shown in FIGS. 9 to 13, in particular, and comprises a locking lever 201 which is shown in plan view in FIGS. 9 and 11 and separately perspectively with a view from the front casing shell in FIG. 13.

The locking lever 201 which is disposed substantially between the sprocket wheel assembly 100 and the film winding wheel 9 has four arms and is rotatable by means of a moulded-on bearing bush 202 around a bearing journal 203 attached to the lens carrier 117. The locking lever 201 has, on a first lever arm 204, a first pawl 205 which can apply itself to the circumference of the grooved disc 110 of the sprocket wheel assembly 100 and engage in one of the grooves 111, 112 of the grooved disc 110 if the latter approaches the pawl 205 by means of one of said grooves during the rotation of the film sprocket wheel 101. On the second lever arm 206, the locking lever 201 has a second pawl 207 which can engage in a milling on the circumference of the film winding wheel 9 of the film winding device in order to lock the latter against rotation in the anticlockwise direction of rotation (FIG. 3) and, consequently, to lock it against rotation in the direction of the film winding if the first pawl 205 of the locking lever 201 engages in one of the grooves 111, 112 of the grooved disc 110.

In addition, there are disposed on the bearing bush 202 of the locking lever 201 a third lever arm 208 and a fourth lever arm 209 which are shorter than the first and second lever arms 203, 206. The third and fourth lever arms 208, 209 form a fork for receiving a switching element 320, described in greater detail below, of the shutter release and actuating device 300.

The third lever arm 208 is elastic and can deflect to some extent by means of its free end towards the second lever arm 206 under the action of the switching element 320, as a result of which the third lever arm 208 forms, in the deflected position, an energy storage spring as a result of whose action the first pawl 205 of the locking lever 201 is up against the groove disc 110 of the sprocket wheel assembly 100 and engages at a given time in one of the grooves 111, 112 of the grooved disc 110. The elastic deformation and deflection of the third lever arm 208 take place in such a way that the maximum elastic deflection provided of the free end of the third lever arm 208 is achieved only shortly before reaching the position in which the first pawl 205 of the locking lever 201 engages in one of the grooves 111, 112 of the grooved disc 110 with the discharge of the energy stored in the third lever arm 208 as a result of its elastic deflection, as a result of which the second pawl 207 engages in the milling of the film winding wheel 9 and, consequently, the sprocket wheel assembly with the film sprocket wheel 101 and the film winding wheel 9 are each locked against further rotation.

After the photographic shutter is released, the fourth lever arm 209 serves to return the locking lever 201 under the action of the switching element 320 of the shutter release and actuating device 300 to a position in which the film winding wheel 9 and the sprocket wheel assembly 101 are again unlocked in order to make it possible for the film to be wound on again by a subsequent frame.

The locking lever 201 and the first to fourth lever arms 204, 206, 208, 209 including the first and second pawls 205, 207 and including the bearing bush 202 disposed on it are preferably designed integrally and preferably manufactured as a single plastics-material moulded part the configuration and dimensioning of the third lever arm 208 and the plastics material selected to produce the locking lever 201 being matched to one another with regard to its material properties in such a way that an elastic deflection and resetting of the free end of the third lever arm 208 are made possible in accordance with the above description and the functional description below.

In detail, the operating sequence of the locking and unlocking movements of the locking lever 201 in opposite directions is described in greater detail, on the one hand, as a function of the film winding and, on the other hand, as a function of the release and actuation of the photographic shutter of the camera in the course of the description of the shutter release device 300 below.

The embodiments of a winding mechanism locking device described above are examples of the embodiment of the general teaching of providing, in the case of a camera having a film winding device 9 for winding a photosensitive film disposed in the camera, a shutter release device 300 for releasing a photographic shutter 10 of the camera and a winding mechanism locking device 200 which can be transferred under the action of an energy storage spring 208 as a function of the film advance by one frame to a locking position which locks the film winding device 9 and can be transferred, and as a function of the actuation of the shutter release device 300, to a release position which unlocks the film winding device 9, an energy storage spring 208 which is tension-relieved if the winding mechanism locking device 200 is in the locking position and if it is transferred to the release position and which is increasingly tensioned by a control device 104, 106 which is moved during film winding each time the film is wound on by the length of one frame following a shutter release. Preferably, the energy storage spring 208 of the winding mechanism locking device 200 is maximally tensioned by the control device 104, 106 shortly before the winding-on of the film by one full frame is complete and the winding mechanism locking device 200 assumes its locking position. The winding mechanism locking device 200 is able to lock the control device 104, 106 in the locking position.

The energy storage spring 208 of the winding mechanism locking device 200 may be tensioned preferably by the shutter release device 300 if the latter is transferred to a release standby position after the shutter release by the control device 104, 106 has taken place. Preferably, the energy storage spring 208 of the winding mechanism locking device 200 can be tensioned by a switching element 320 of a release lever 301 of the shutter release device 300, under which circumstances said switching element 320 can transfer the winding mechanism locking device 200 from the locking position to the release position.

Preferably, the winding mechanism locking device 200 has a locking lever 201 on which the energy storage spring is formed as a resilient lever arm 208. The resilient lever arm 208 may form, with a further lever arm 209 of the locking lever, a fork in which the switching element 320 of the release lever 301 of the shutter release device 300 engages, under which circumstances the switching element 320 can effect, via the fuher lever arm 209 of the locking lever 201, the transfer of the winding mechanism locking device 200 from the locking position to the release position and, during the subsequent film winding, the tensioning of the resilient lever arm 208.

The winding mechanism locking device 200 may be controlled by a further control device 110 which is joined to the control device 104, 106 which brings about the tensioning of the energy storage spring 208 of the winding mechanism looking device 200. The energy storage spring 208 of the winding mechanism locking device 200 may optionally be displaced by the control device 104, 106 and the winding mechanism locking device 200 may optionally be displaced by the further control device 110. The further control device 110 can form a subassembly with the control device 104, 106 which brings about the tensioning of the energy storage spring 208 of the winding mechanism locking device 200 and may be provided with the control device 104, 106 which brings about the tensioning of the energy storage spring 208 of the winding mechanism locking device at a sprocket wheel assembly 100 comprising a film sprocket wheel 101 of the camera.

Preferably, the locking lever 201 of the winding mechanism locking device 200 has a pawl 205 which can engage in a groove 111, 112 of the further control device 110 designed as a grooved disc. The locking lever 201 may comprise a locking pawl 207 which engages in a locking toothing of the film winding device 9.

Preferably, the winding mechanism locking device 200 may be controllable by a further control device 210, 440–444 in such a way that the winding mechanism locking device 200 is switched inoperatively in at least one predetermined counting position of a picture counting device 400 of the camera. The locking lever 201 of the winding mechanism locking device 200 may have, for this purpose, a stop element 210 which can rest against stops 440, 441, 442, 443, 444 of a picture counting disc 401 of the picture counting device 400.

Preferably, the locking lever 201 of the winding mechanism locking device 200 with its lever arms 208, 209, its pawls 205, 207 and/or its stop element 210 is formed integrally from plastics material. It may be rotatably mounted on a bearing axis 202 attached to a lens carrier 117 of the camera.

Shutter release device

Figure 14:
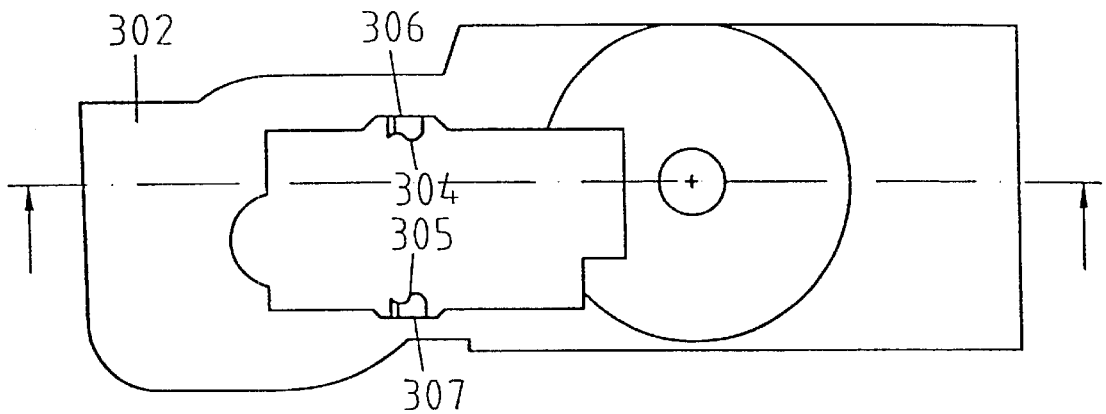
FIG. 14 shows a plate serving to mount a release lever of the camera in accordance with FIGS. 1 to 13 in a separate plan view.
Figure 16:
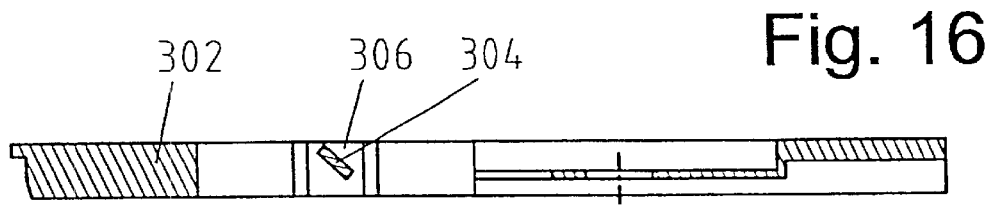
FIG. 16 shows the plate in accordance with FIG. 14 in section along a sectioning line shown in FIG. 14.
Figure 17:
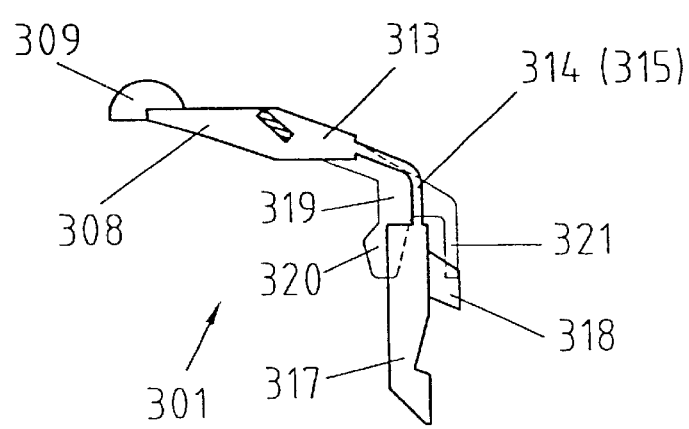
FIG. 17 shows the release lever in accordance with FIG. 15 in front elevation.

The shutter release device 300 serves to release and actuate the photographic shutter of the camera and, for this purpose, interacts with the sprocket wheel assembly 100 and with the winding mechanism locking device 200. The shutter release device shown in FIGS. 14 to 24, in particular, comprises a release lever 301 which has in principle three arms and which is separately shown in FIG. 15 in plan view and in FIG. 17 in front elevation. The release lever 301 is disposed on a plate 302 fixed to the casing in a cutout 303 of said plate. The plate 302 separately is shown in FIG. 14 in plan view and in FIG. 16 in a section along a sectioning line shown in FIG. 14. The release lever 301 is attached to the plate 302 by means of two web-type linking elements 304, 305 which are rectangular in cross section at opposite side faces 306, 307 of the plate 302 forming the cutout 303. The plate 302 and the release lever 301 attached thereto by means of the linking elements 304, 305 have been manufactured integrally from plastics material together with the linking elements 304, 305, the linking elements 304, 305 forming short square torsion rods around which the release lever 301 can be swivelled around an axis of rotation determined by said linking elements by twisting the linking elements 304, 305. The linking elements 304, 305, which are rectangular in cross section, are situated with the longitudinal axis of said cross section inclined to the plane of the plate 302 in order to absorb as well as possible the forces resulting during the release and actuation of the shutter and acting in an inclined direction on the release lever 301.

Figure 15:
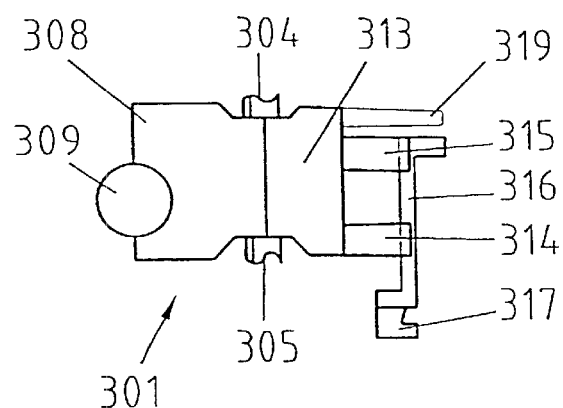
FIG. 15 shows the release lever mounted on the plate in accordance with FIG. 14 in a separate plan view.

The configuration of the release lever 301 is described in greater detail below. Formed onto a first lever arm 308, which is approximately plate shaped in accordance with FIG. 15, is a dome 309 which extends upwards through an opening 310 in the casing region forming a camera upper section 311. The opening 310 is covered by a membrane 312 attached to the camera upper section 311. The dome 309 can be pressed downwards by manually depressing the membrane 312, under which circumstances the release lever 301 is swivelled anticlockwise in the view in accordance with FIG. 17 around the axis of rotation formed by the torsionable linking elements 304, 305.

A second lever arm 313 of the release lever 301 has two mutually parallel, comparatively narrow, angularly curved elastic webs which are designated below as spring webs 314, 315. Instead of the two spring webs 314, 315 shown in the drawings, only one spring web may be provided or even more than two spring webs may be provided. They extend perpendicularly to the axis of rotation of the release lever 301 formed by the linking elements 304, 305 and have at the end a transverse web 316 with an actuating arm 317, extending forwards parallel to the axis of rotation of the release lever 301, for actuating the shutter blade 10 and also a lug type projection 318 which projects perpendicular to said axis of rotation and which forms a contact element for sensing control faces of the control element 104, 106 of the sprocket wheel assembly 100 in the axial direction.

Furthermore, the release lever 301 has a third lever arm 319 which extends largely parallel to the second lever arm 313, but is inherently preferably rigid. The third lever arm 319 has, at an end angled downwards in the view in accordance with FIG. 17, the switching element 320 mentioned in the above description section entitled "Winding mechanism locking device" and also a contact element 321 which serves to sense control faces of the control element 104, 106 of the sprocket wheel assembly 100 predominantly radially. The switching element 320 engages in the gap between the third and fourth lever arms 208, 209 of the locking lever 201 of the winding mechanism locking device 200 which form a fork.

The operating sequence of the functions operating in connection with the shutter release is now described in greater detail below.

Figure 18:
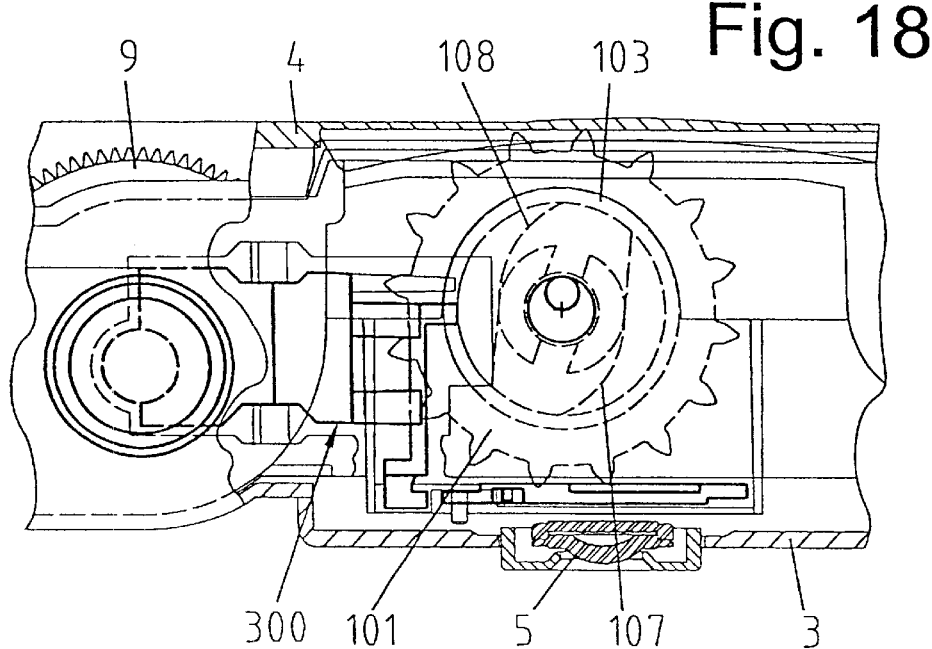
FIG. 18 shows parts of the camera in plan view in the state of readiness for release.
Figure 19:
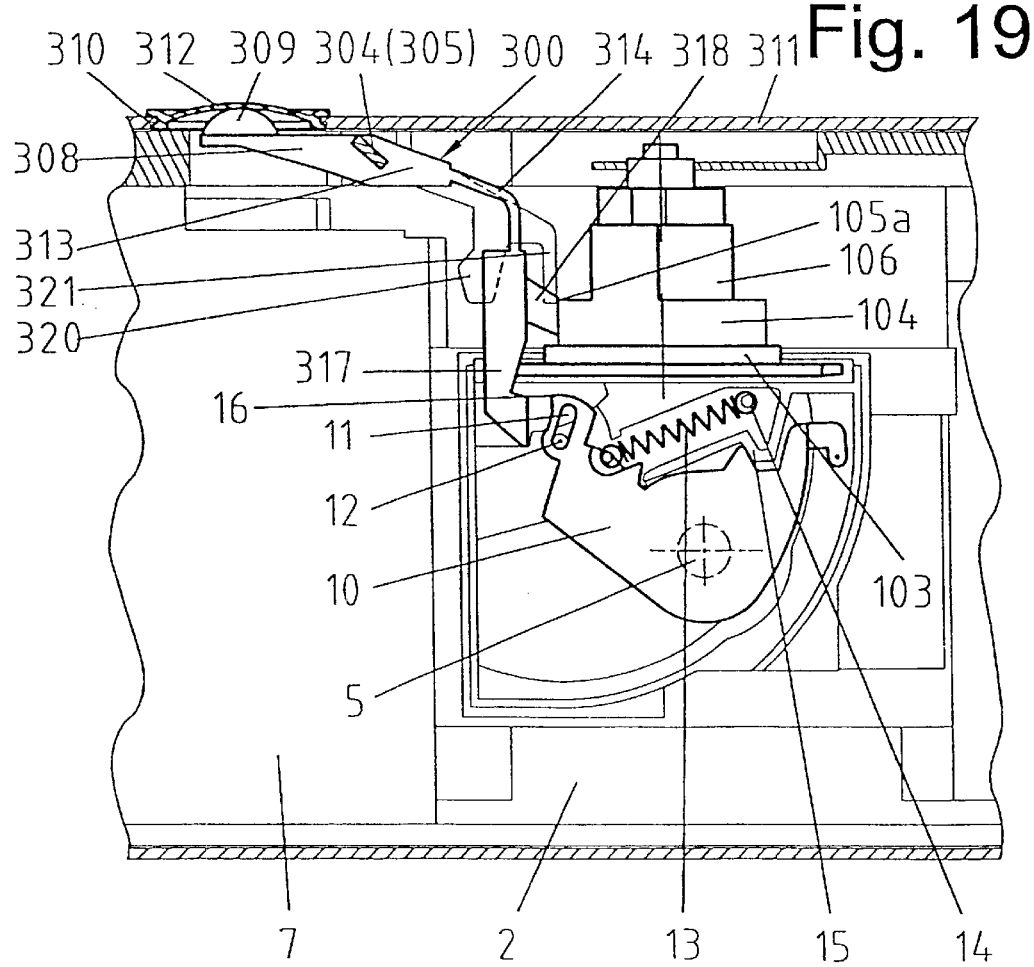
FIG. 19 shows the subject matter of FIG. 18 in front elevation.

FIGS. 18 and 19 show the camera in the release standby state in which, in accordance with FIG. 9, the first pawl 205 of the locking lever 201 of the winding mechanism locking device 200 engages in one of the grooves 111, 112 of the grooved disc 110 of the sprocket wheel assembly 100 and the second pawl 207 of said locking lever 201 engages in the milling of the film winding wheel 9, which is consequently locked against rotation in the film winding direction. At the same time, the elastic third lever arm 208 of the locking lever 201 assumes a position in which it is tension-relieved.

The release lever 301 is not pretensioned in its spring webs 314, 315 or at most only slightly pretensioned so that its contact element 318, designed as a lug-type projection, rests against the cylindrical wall face 105 of the cylindrical piece 104 of the sprocket wheel assembly 100. The cam surfaces 107, 108 of the cam piece 106 of the sprocket wheel assembly 100 assume under these circumstances an angular position such as is evident from FIG. 19.

If the dome 309 in the view in accordance with FIG. 19 is pressed downwards by the user to release the shutter by depressing the membrane 312, the release lever 301 executes, by twisting the linking elements 304, 305, an anticlockwise swivelling movement around the axis of the linking elements. Owing to the fact that the lug-type projection 318 rests against the cylindrical wall face 105 of the cylindrical piece 104 of the sprocket wheel assembly 100, the second lever arm 313, which carries the shutter actuation arm 317, is able to participate in said swivelling movement of the release lever 310 only insofar as said lever arm 313 rises upwards from the position in accordance with FIG. 19 in the direction of the position in accordance with FIG. 20, under which circumstances the spring webs 314, 315 are bent to a greater extent with the reduction of the angle they form. As a consequence of the properties of the plastics material from which the release lever 301 is integrally moulded, an elastic stress consequently builds up in the spring webs 314, 315 so that the release lever 301 becomes an energy store in its part comprising the spring webs 314, 315.

Figure 20:
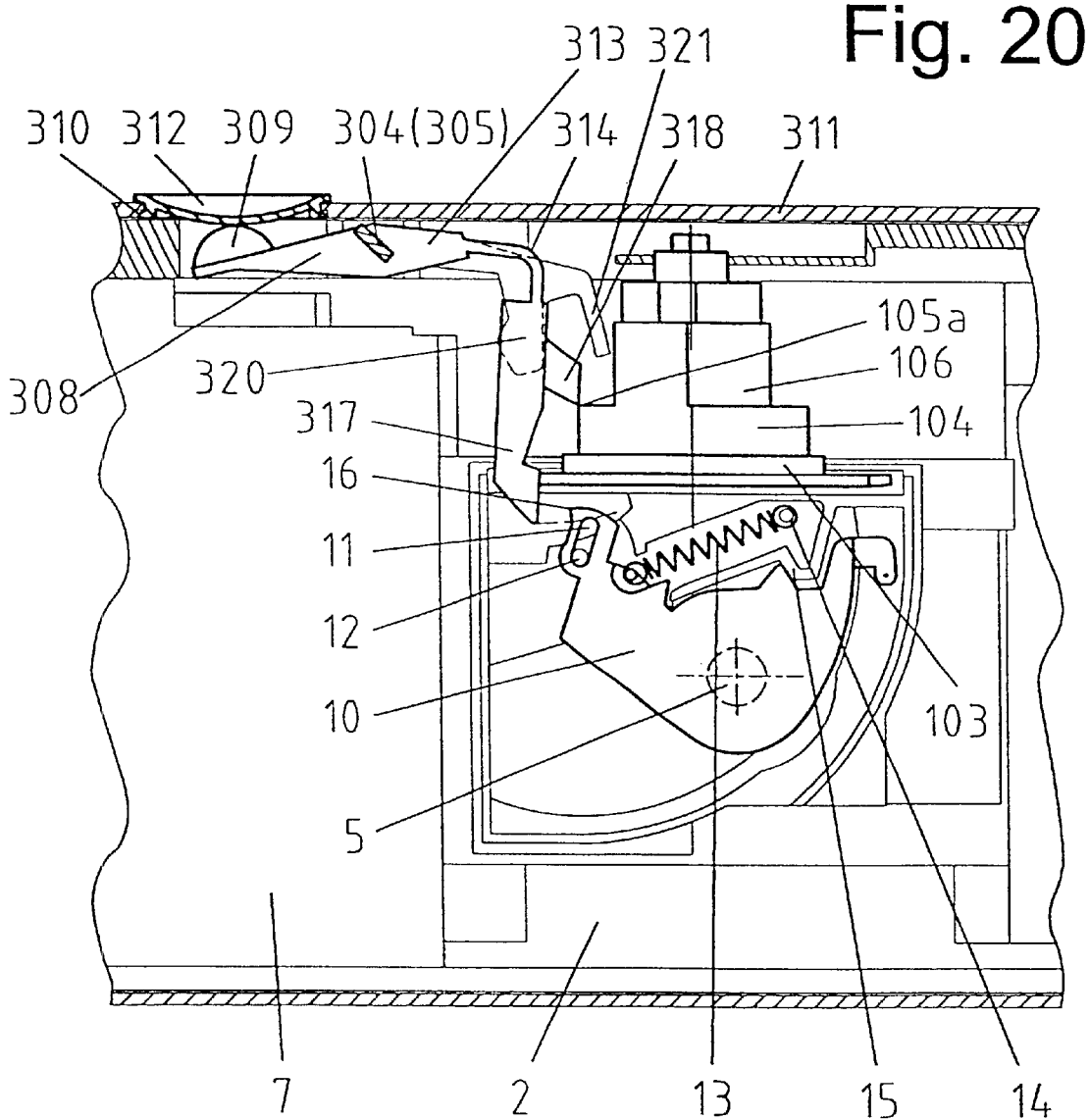
FIG. 20 shows the subject matter of FIG. 19 after a first partial movement of the release lever.

Once the release lever 301 has swivelled far enough as a result of depressing the membrane 312, the lug-type projection 318 separates from one of the upper edges 105a of the cylindrical wall face 105 of the cylindrical piece 104 of the sprocket wheel assembly 100. FIG. 20 shows the position of the release lever 301 shortly before the separation of the lug-type projection 318 from the upper edge 105a of the cylindrical wall face of the cylindrical piece 104.

Figure 21:
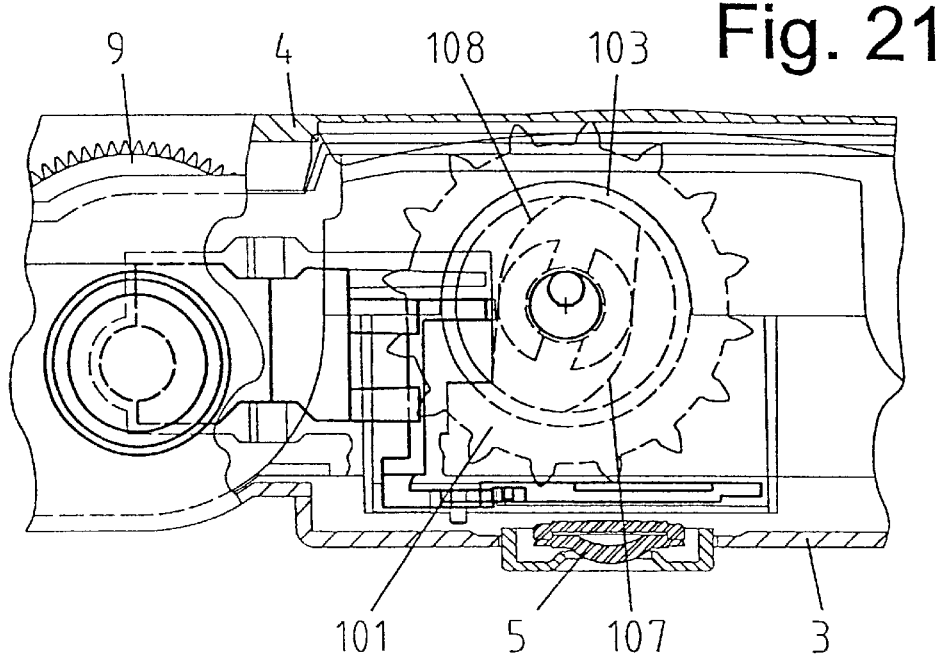
FIG. 21 shows the subject matter of FIG. 18 in the state of shutter release in plan view.
Figure 22:
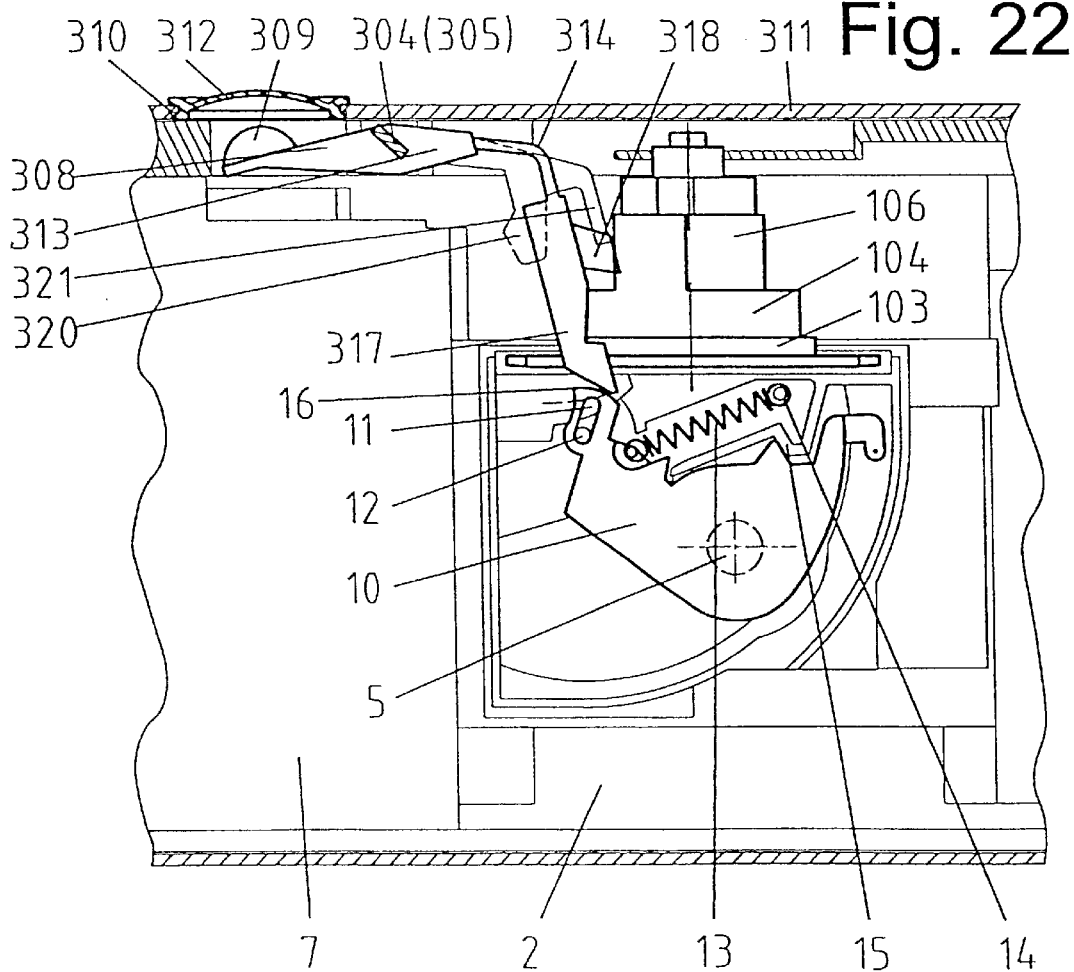
FIG. 22 shows the subject matter of FIG. 21 in front elevation.

After the lug-type projection 318 has separated from the upper edge, forming a separation edge 105a, of said wall face 105, the mechanical stress built up in the spring webs 314, 315 has the effect that the spring webs 314, 315 suddenly become unstressed and the shutter actuation arm 317 flicks to the right out of the position in accordance with FIG. 20 anticlockwise into a position shown in FIGS. 21 and 22, with the discharge of the energy stored in the spring webs 314, 315. During the movement from the position in accordance with FIG. 20 into the position in accordance with FIGS. 21 and 22, the actuation arm 317 of the release lever 301 engages the actuation stop 16 of the shutter blade 10 and rotates the latter in a centrifugal movement in the clockwise direction against the action of the closing spring 13. Under these circumstances, the release lever 301 with its shutter actuation arm 317 separates again from the actuation stop 16 of the shutter blade 10 and applies itself with its lug-type projection to a first section, which is spiral in cross section, of the first cam face 107, for example, of the cam piece 106, as is evident especially from FIG. 22.

As a result of the catapult movement, described above, of the shutter blade 10, the shutter in the lens beam path is opened briefly, as a result of which a picture is recorded on the film loaded in the camera. The opening time of the shutter is limited in a predetermined way since the shutter blade 10 is quickly returned again to its closed position by its closure spring 13. As a result, the shutter blade 10 reaches the functional state shown in FIG. 22.

The inherently rigid third lever arm 319 of the release lever 301 also participates in the swivelling, described above, of the release lever 301 for the purpose of opening the shutter by striking the shutter blade. During said swivelling movement, the lever arm 319 with its switching element 320 drives the fourth lever arm 209 of the locking lever 201 of the winding mechanism locking device and, in doing so, swivels the locking lever 201 in such a way that the locking lever 201 with its first and second pawls 205, 207 is lifted out of the respective groove of the grooved disc 110 of the sprocket wheel assembly 100 or out of the milling of the film sprocket wheel 9 so that the film winding wheel 9 and the sprocket wheel assembly 100 are unlocked. Although the elastic lever arm 208 of the locking lever 201 also participates in this tension release movement of the locking lever 201, it remains under these circumstances in its tension-relieved state which it had also already assumed beforehand.

After said unlocking of the film winding wheel 9 and of the sprocket wheel assembly 100, the film can again be wound on by one frame by manual actuation of the film winding wheel 9. The switching operations taking place in this process are described in greater detail below.

Figure 23:
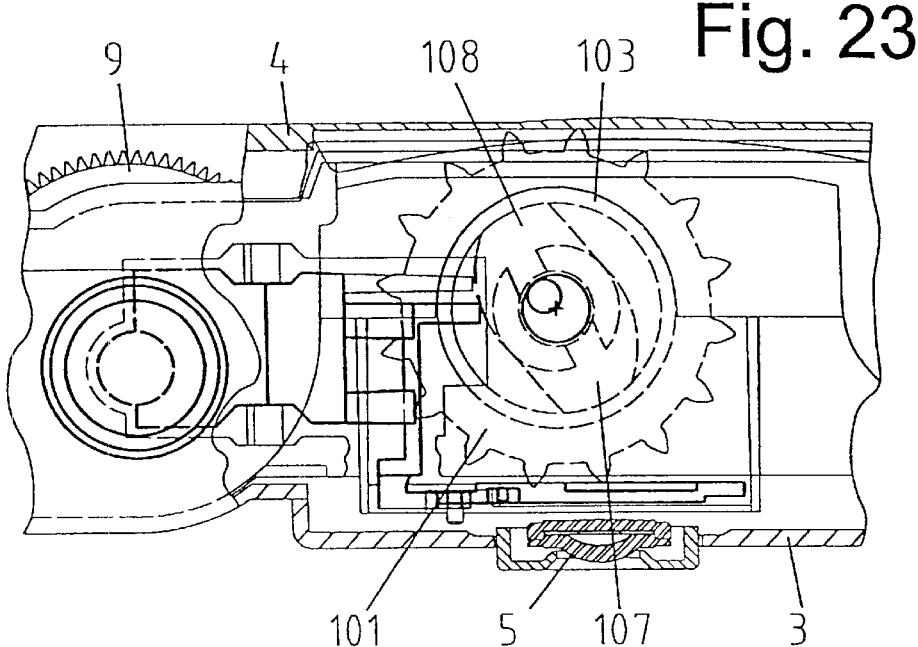
FIG. 23 shows the subject matter of FIG. 22 in the state following the actuation of the shutter in plan view.
Figure 24:
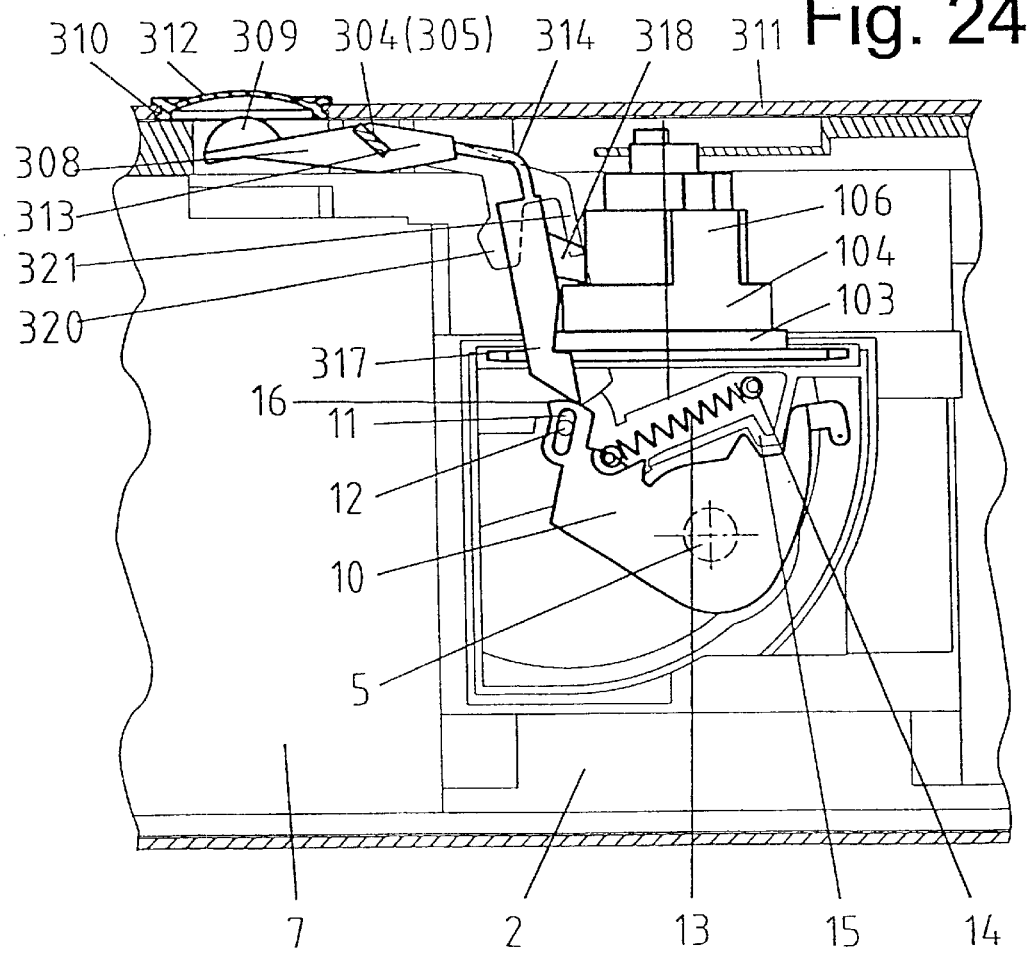
FIG. 24 shows the subject matter of FIG. 23 in front elevation.

When this film winding movement is performed, the film sprocket wheel 101, and with it the entire sprocket wheel assembly 100, is set in motion and rotated through 180° around the axis of rotation of the film sprocket wheel 101. The functional state after a first partial rotation through approximately 45° is shown in FIGS. 23 and 24. Because of the resting of the contact element 321 of the lever arm 319 and of the lug-type projection 318 of the lever arm 313 against the section, spiral in cross section, of the first cam face 107 of the cam piece 106, the release lever is continuously displaced clockwise during the rotation, described above, of the sprocket wheel assembly 100 through 180°. This brings about, on the one hand, a resetting of the release device 300 to the release standby position and, on the other hand, a loading of the energy storage spring 208 of the winding mechanism locking device 200, as is explained in greater detail below.

Because it is mounted by means of the elongated hole 11, the actuation stop 16 of the shutter blade 10 briefly deflects downwards against the action of the closing spring 13 during the resetting of the release lever 301 without a renewed opening of the shutter occurring. At the same time, after the dome 309 has been applied to the membrane 312, stress again builds up in the spring webs 314, 315 which has the effect that the lug-type projection 318 of the release lever 301 slides off the first cam face 107 of the cam piece 106 of the sprocket wheel assembly 100 onto the cylindrical wall face 105 of the cylindrical piece 104 as soon as the sprocket wheel assembly 100 has reached, in the course of the above-mentioned rotation through 180°, an angular position such that the lug-type projection 318 of the release lever 301 rests against the cylindrical circumferential component section 109 of the first cam face 107 of the cam piece 106.

The sliding of the lug-type projection 318 of the release lever 301 off the cylindrical circumferential component section 109 of the first cam face 107 of the cam piece 106 onto the cylindrical wall face 105 of the cylindrical piece 104 results in a practically complete tension relief in the spring webs 314, 316 of the release lever 301 so that, after completing the 180° rotation of the sprocket wheel assembly 100, the release lever 301 reaches a position corresponding to the position in accordance with FIGS. 14 and 15, but with the difference that the positions of the first and second cam faces 107, 108 of the cam piece 106 of the sprocket wheel assembly 100 are mutually interchanged compared with the initial state in accordance with FIGS. 14 and 15 as a consequence of their rotation in the meantime through 180°. In this process, the energy storage spring, formed by the spring webs 314, 315, of the release device 300 are virtually tension-relieved again.

Furthermore, as a result of resetting the release lever 301 brought about by the respective cam face 107 or 108 of the cam piece 106 of the sprocket wheel assembly 100 to its starting position, the result is achieved that the switching element 320 of the release lever 301 applies itself to the third lever arm 208 of the locking lever 201 of the winding mechanism locking device and the free end of said third lever arm 208 is increasingly forced aside in the direction of the second lever arm 206 utilizing the elasticity of said lever arm 208, with increasing angular displacement of the cam piece 106 of the sprocket wheel assembly 100 so that there is increasingly built up, in the third lever arm 208, an elastic tension which has the effect that the locking lever 201 with its first pawl 205 is applied with increasing pressure to the grooved disc 110. It therefore engages in that groove of the grooved disc 110 which approaches the pawl 205 if the sprocket wheel assembly 100 has completed its rotation through 180°. The increasing elastic deformation, corresponding to the rise of the respective cam face 107 or 108 of the cam piece 106, of the third lever arm 208 of the locking lever 201 of the winding mechanism locking device has the consequence that energy stored in the third lever arm 208 as a result of its increasing elastic deformation reaches the maximum value only when the film sprocket wheel 101 and consequently also the grooved disc 110 have almost completed their rotation through 180°. The spring tension in the third lever arm 208 of the locking lever 201 consequently reaches its full value only shortly before the grooved disc 110 reaches the angular position in which the first pawl 205 of the locking lever 201 engages in the groove 111 or 112, which has moved forward, of the grooved disc 110 and consequently brings about the locking of the film winding wheel 9. As a result of the engagement of said pawl 205 in the respective groove of the grooved disc 110, the third lever arm 208 springs back into its tension-free starting position so that the tension built up in the lever arm 208 is discharged again.

Shortly before the sprocket wheel assembly 100 completes its 180° revolution and the locking lever 201 with its pawl 205 engages in the respective groove 111 or 112, which has moved forward, of the grooved disc 110, the contact element 321 of the third lever arm 319 of the release lever 301 detaches from the respective sensed cam face 107 or 108 and of that respective cylindrical component face 109 of the cam piece 106 which is next in the direction of rotation of the sprocket wheel assembly 100 since the angular position of the transition from the respective cylindrical component face 109 of the cam piece 106 to the respective set-back cam face 107 or 108 which is next in the direction of rotation of the sprocket wheel assembly 100 and which receives in the transition region from the cylindrical component face 109 is slightly offset with respect to the angular position of the groove 111 or 112 of the grooved disc 110. If, therefore, the pawl 205 of the locking lever 201 engages in the groove 111 or 112 of the grooved disc 110 during the rotation of the sprocket wheel assembly 100, the contact element 321 of the lever arm 319 of the release level 301 has already left the respective cylindrical component face 109 of the cam piece 106 shortly before. However, the contact element 321 can nevertheless no longer follow the recession of the adjacent cam face 107 or 108 since the lug-type projection 318 of the lever arm 313 of the release lever 301 is again resting against the cylindrical wall face 105 of the cylindrical piece 104 and prevents a reverse rotation of the lever arm 319 of the release lever 301.

The angular offset between the transition region from the respective cylindrical component face 109 to the adjacent cam face 107 or 108 and to the respectively assigned groove 111 or 112 of the grooved disc 110 is kept so small that the danger is very small of an undesired release of the shutter by the user of the camera before completion of a respective film winding by a full picture length and, consequently, prior to the completion of a 180° rotation of the sprocket wheel assembly 100 is very small in the angular region of the angle of rotation of the sprocket wheel assembly in which the contact element 321 of the lever arm 319 of the release lever 301 has already left the cylindrical component face 109 of the cam piece 106 of the sprocket wheel assembly 100 and has consequently been released, but the locking lever 201 of the winding mechanism locking device 200 has not yet engaged in the assigned groove 111 or 112 of the grooved disc 110.

Incidentally, the following applies: if after a photograph has been taken, the film is accidentally not indexed by a complete frame by the user of the camera as a result of only partly actuating the film winding wheel 9 and the film winding is therefore interrupted, for example, after half a frame, the sprocket wheel assembly 100 has also not completed the initiated rotary movement through 180°. In this intermediate state, the release lever 301 is locked against reactuation. The elastic third lever arm 208 of the locking lever 201 is still not completely deflected and the energy storage spring formed by the third lever arm 208 is consequently not yet fully loaded so that the danger of fatigue of the elasticity of the third lever arm 208 as a consequence of possible cold flow processes is advantageously also reduced in that case and is virtually eliminated if the camera is left or stored for a fairly long time in this intermediate state after an only partial indexing of the film has been carried out by the user before the interrupted film indexing is completed up to a full frame before a further photograph is taken later. On the other hand, as a result of the preferably elastic design of the third lever arm 208 of the integrally designed locking lever 201, an energy store is formed for the transfer of the locking lever 201 to its locking position without a separate spring having to be provided for displacing the locking lever 201 into the locking position.

Analogous remarks also apply to the energy store, formed by the spring webs 314, 315, of the release device 300.

As a result of the fact that the release device 300 is returned from the terminal position which it assumes after a shutter release to the standby position for a repeat shutter release by the control element 104, 106, first moved during the film winding, of the sprocket wheel assembly, an accidental repeat shutter release prior to the indexing of the film is not possible after an intentionally performed shutter release, for which reason a separate double exposure lock does not advantageously have to be provided in the camera described above.

The embodiment, described above, of a shutter release device is an example of the embodiment of the general teaching of providing, in the case of a camera having a film winding device 9 for winding on a photosensitive film disposed in the camera, a photographic shutter 10, disposed in the beam path for the picture recording, for the purpose of picturewise exposure of the photosensitive film and a shutter release device 300 which assumes a standby position prior to the shutter release and a terminal position after the shutter release and has an energy storage spring 314, 315 which is tensioned by displacing the shutter release device from the standby position to the terminal position in order to actuate the shutter 10, the shutter release device being capable of being returned from the terminal position to the standby position, an energy storage spring 314, 315 of the shutter release device in such a way that it is not tensioned in the standby position and in the terminal position and of providing a control device 104, 106 which is moved during film winding for returning the shutter release device 300 from the terminal position to the standby position. Preferably, the energy storage spring 314, 315, which is tension-relieved in the terminal position of the shutter release device 300 is temporarily tensioned during the return of the shutter release device to the standby position and tension-relieved again.

The shutter release device 300 may preferably comprise a first contact element 318, interacting with the control device 104, 106, for tensioning and tension-relieving the energy storage spring 314, 315, said first contact element 318 for tension-relieving the energy storage spring 314, 315 is guided over a separation edge 105a of the control device 104, 106. Furthermore, the shutter release device 300 may comprise a second contact element 321, interacting with the control device 104, 106, for returning the shutter release device 300 from the terminal position to the release standby position.

The control device 104, 106 may comprise at least one cam face 107, 108 which can be sensed by the first contact element 318 and the second contact element 321 of the shutter release device 300.

Preferably, the shutter release device 300 may comprise a multi-arm release lever 301 which comprises the energy storage spring 314, 315 on a lever arm 313. In that case, the energy storage spring 314, 315 can be formed by one or more elastic webs of the lever arm 313 which may, in turn, contain the first contact element 318. The lever arm 313 may comprise a shutter actuating element 317 which can interact with the shutter 10 via a coupling 16 which acts on one side.

Preferably, the second contact element 321 may be disposed on a further lever arm 319 of the release lever 301. It can be separated from the control device 104, 106 if the closure release device 300 is in the release standby position. In particular, the second contact element 321 can be separated from the control device 104, 106 shortly before completion of each film winding by one frame. Preferably, the second contact element 321 is separated from the control device 104, 106 shortly before a further control device 110 for a winding mechanism locking device 200 of the camera brings about the transfer of the winding mechanism locking device 200 to a locking position.

The control device 104, 106 for the shutter release device 300 and the further control device 110 for the winding mechanism locking device 200 may preferably be joined together and may preferably be joined in a movement-locked manner to a film sprocket wheel 101 of the camera. The control device 104, 106 and/or the further control device 110 may be integrally formed with a film sprocket wheel 101 of the camera from plastics material.

Preferably, the further lever arm 319 of the release lever 301 may comprise a switching element 320 which interacts with a winding mechanism locking device 200 of the camera. A further lever arm 308 of the release lever 301 may form a release key with a release actuator 312. The release lever 301 may be formed integrally with the lever arms 308, 313, 319 including the energy storage spring 314, 315 from plastics material. Preferably, the release lever 301 is formed integrally with a carrier plate 302 of the camera from plastics material and is rotatably joined to it via torsionable linking elements 304, 305.

Picture counting device

The film sprocket wheel 101 is joined to a picture counting device 400 which is described below in a plurality of exemplary embodiments. In these exemplary embodiments, the picture counting device counts the number of pictures already taken and indicates in each case how many remaining pictures can still be taken before the photographing capacity of the film situated in the camera is completely exhausted.

In the above-mentioned exemplary embodiments, a sequence of 27 pictures can be consecutively recorded on a film loaded in the camera after a blank picture preceding the first photograph corresponding to a standard film leader, after which one or more blank pictures may still follow corresponding to a standard film trailer. In order to indicate to the camera user how many pictures can still be recorded on the film loaded in each case, a picture counting device 400, joined, preferably in a shape-locked manner, to the film winding device of the camera, is fitted for counting the 28 counted objects comprising a blank picture and 27 photographs. In the exemplary embodiments shown, the picture counting device counts downwards, starting from an "initial" blank picture, from picture number 27 down to picture number 1 and up to a terminal "final" blank picture during the consecutive winding steps for the purpose of picturewise film winding.

Figure 25:
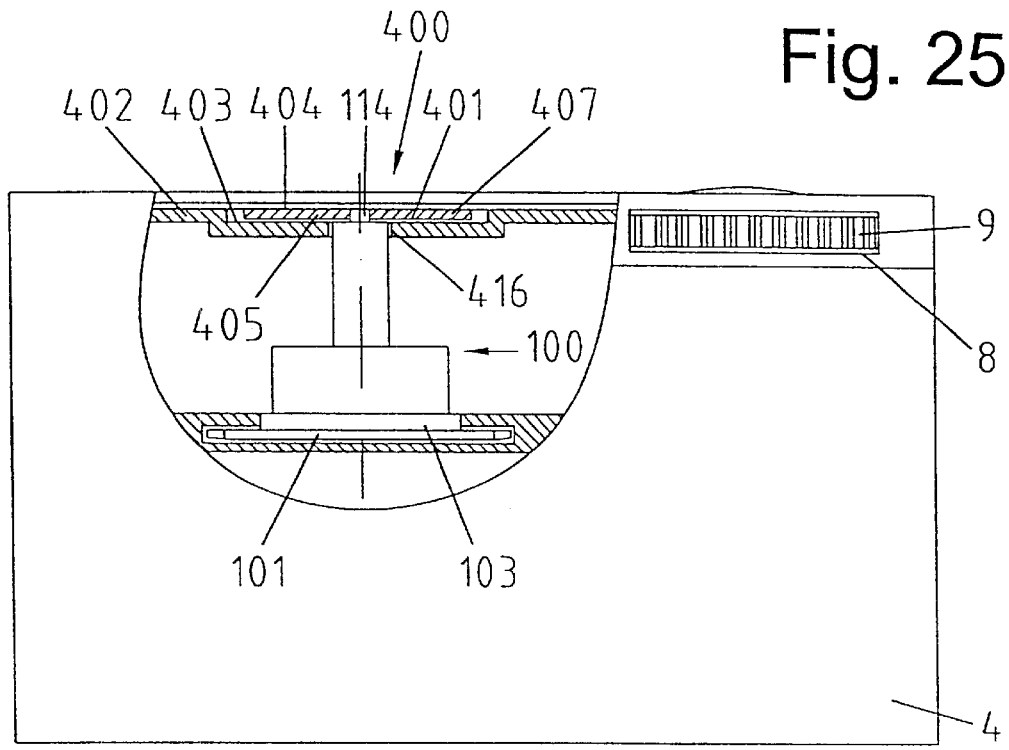
FIG. 25 shows the camera in rear elevation with rear casing shell partly cut away to show the arrangement of the picture counting device in the camera.
Figure 26:
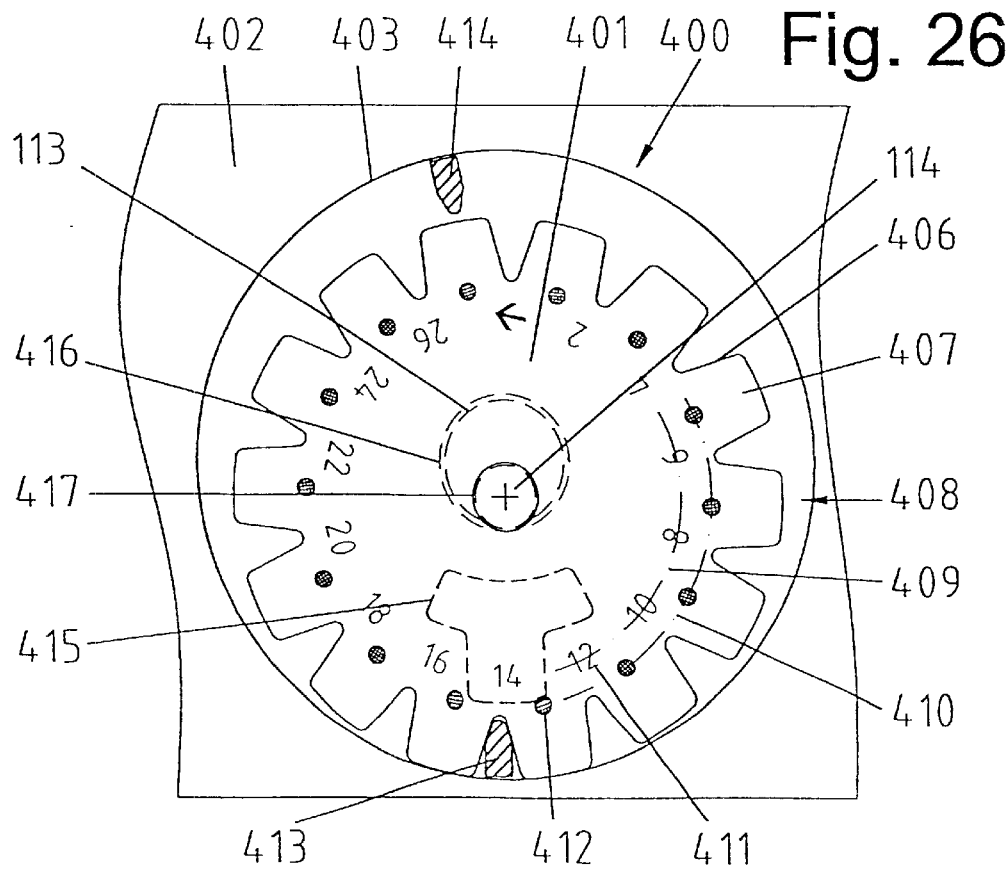
FIG. 26 shows parts of the picture counting device in accordance with FIG. 25 in enlarged view.
Figure 27:
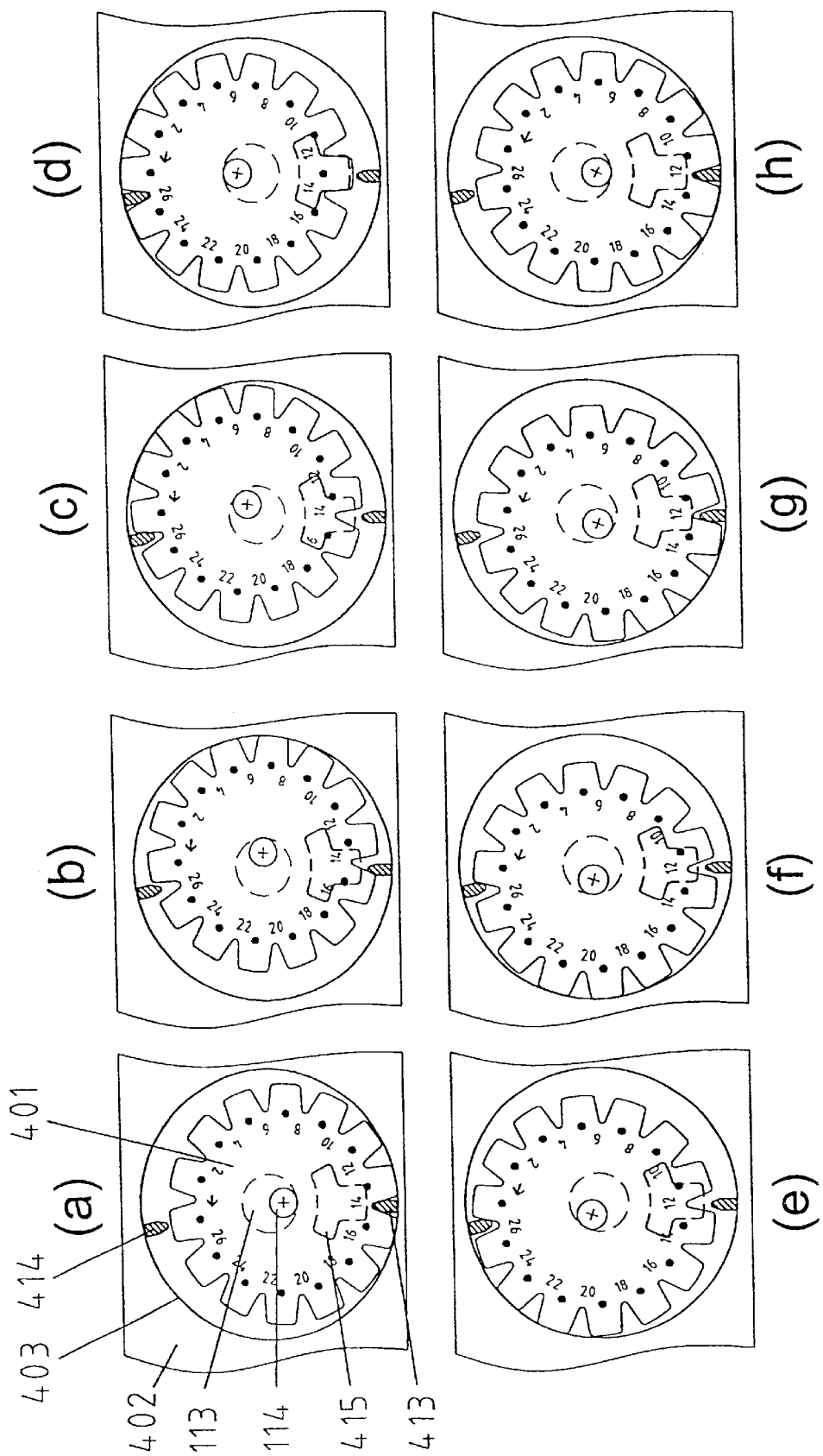
FIGS. 27(a) to 27(h) show a picture counting disc of the picture counting device in accordance with FIG. 25 to show consecutive setting steps for indicating, for example, three consecutive picture numbers.

A first preferred embodiment is said counting device 400 is shown in FIGS. 25 to 27 and is explained in greater detail below.

The centerpiece of the picture counting device 400 is a picture counting disc 401 which is situated immediately underneath the upper casing wall of the camera and is disposed on a plate 402 attached to the core assembly 2 in a shallow recess 403 of the latter. Said shallow recess 403 forms a bearing cavity in which the picture counting disc 401, which is coupled to the eccentric pin 114 of the sprocket wheel assembly 100, is mounted rotatably and displaceably or shiftably in the manner described in greater detail below.

The picture counting disc 401 shown in enlarged form in FIG. 26 is designed as a thin circular platelet, preferably made of plastics material, and forms an upper face 404 and a lower face 405. Situated on the upper face 404 of the picture counting disc 401 is an aggregate of 28 counting marks which correspond to the number of 28 objects being counted and which are described in still further detail below.

At its outer, circular circumference, the picture counting disc 401 has a number of 14 notch-shaped incisions which are described below as notches 406 for short and are distributed round the circumference of the picture counting disc at angularly identical mutual distances. The number of notches 406 corresponds to half the number of 28 counting marks disposed on the picture counting disc 401. The notches 406 are each of wedge-shaped design and are disposed so that their notch tips each point to the centre of the picture counting disc 401 and are situated on a notch circle concentric with the centre of the picture counting disc 401. Between every two adjacent notches 406 are formed trapezoidal teeth 407 which together form a toothed rim 408 comprising 14 teeth 407 on the picture counting disc 401.

On the picture counting disc 401, half the 28 counting marks are disposed in each case on two counting mark circles 409, 410 concentric with the centre of the picture counting disc 401. The radius of the inner counting mark circle 409 is preferably less and the radius of the outer counting mark circle 410 is preferably equal to or greater than the radius of the notch circle on which the wedge tips of the notches 406 are situated. The mutual spacing of the two counting mark circle 409, 410 corresponds to a maximum radial displacement path, explained in greater detail below, of the picture counting disc 401. Disposed on the inner counting mark circle 409 is an aggregate of 14 inner counting marks 411; they are each situated opposite the wedge tips of the notches 406 and are formed by even numbers from 2 to 26 and also by the blank picture symbol in the shape of an arrow. On the other hand, an aggregate of 14 outer counting marks 412 is disposed in each case on or near the teeth 407 between the notches 406 on the outer counting mark circle 410 and, because of the constricted space circumstances at that point, are formed only by mutually similar punctiform marks. At the same time, said punctiform counting marks 412 situated on the outer counting mark circle 410 are angularly situated in each case between two adjacent inner counting marks 411, identified by numbers or the blank picture symbol, of the inner counting mark circle 409.

The diameter of the picture counting disc 401 as the spacing between the outer edges of every two diametrically opposite teeth 407 of the toothed rim 408 is smaller than the diameter of the bearing recess 403 of the plate 402, as is evident, for example, from FIG. 26. This bearing makes possible a displacement of the picture counting disc 401 by means of its lower face 405 inside the bearing recess 403 of the plate over the base of said bearing recess 403 in directions perpendicular to a central axis of the picture counting disc.

Formed at the circumferential rim of the base or at the circumferential inner wall, projecting from the base, of the circular bearing recess 403 are a first detent tooth 413 and a second detent tooth 414. In the exemplary embodiment shown, in which 14 notches 406 and 14 teeth 407 of the toothed rim 408 are provided, the two detent teeth 413, 414 are disposed almost diametrically opposite, the second detent tooth 414 being angularly offset in an anti-clockwise direction by half the width of a tooth 407 of the tooth rim 408 of the picture counting disc 401 from the position of the exactly diametrical arrangement. The first and second detent teeth 413, 414 are each shaped so that they each project with their tooth tips radially into the interior of the bearing recess 403 and can engage in the notches 406 between respective adjacent teeth 407 of the picture counting disc 401. At the same time, the diameter of the picture counting disc 401 is chosen so that, if it is displaced to its maximum possible extent in the direction of one or the other detent tooth 413, 414, only the one or the other of the two detent teeth 413, 414 can engage in each case in a notch 406 and consequently between teeth 407 of the tooth rim 408 of the picture counting disc 401, while the respective other detent tooth is situated outside the tooth rim 408 without engaging in one of the notches 406. On the other hand, the diameter of the picture counting disc 401 is so large that both detent teeth 407 cannot be simultaneously out of engagement with the picture counting disc 401. Accordingly, when the picture counting disc 401 is displaced transversely between the two detent teeth 413, 414, the latter alternately enter full engagement with the toothed rim 408 of the picture counting disc 401, as is described in still greater detail below.

The rear half shell 4 of the camera casing has an upper face and, at a small distance above the picture counting disc 401, a T-shaped viewing window 415 which is long enough in the radial direction of the picture counting disc 401 for it to be possible for the camera user to view visually alternately through the viewing window 415 inner counting marks 411 and outer counting marks 412 of the inner or outer counting mark circle 409, 410, respectively, together or even only one inner counting mark 411 of the inner counting mark circle 409, depending on the position of the picture counting disc 401 inside the bearing recess 403 of the plate 402. The viewing window 415 consequently forms a display device which interacts with the counting marks 411, 412 of the picture counting disc 401, the picture counting disc being displaceable with respect to the indicating device.

The picture counting disc 401 is driven during the film winding and, for this purpose, is mechanically linked to the film winding device or to the film metering device, preferably in such a way that the picture counting device 401 is coupled in a movement-locked manner to the film sprocket wheel 101, of the sprocket wheel assembly 100 shown in simplified form in FIG. 27, which film sprocket wheel 101 engages in the edge perforation of the film loaded in the camera. For this purpose, the spindle end 113 of the sprocket wheel assembly 100 shown in detail in FIGS. 4 and 5 engages through an opening 416 of the bearing recess 103 of the plate 102, the eccentric pin 114 engaging in a central opening 417 of the picture counting disc 401, as emerges, in particular from FIG. 26. The inside diameter of the opening 416 of the bearing recess 403 is large enough for the eccentric pin 114 of the sprocket wheel assembly to be able to move on a circular path during the rotation of the sprocket wheel assembly. On the other hand, the inside diameter of the central opening 417 of the picture counting disc 401 is only slightly larger than the diameter of the eccentric pin 114 so that it can rotate in said central opening 417 of the picture counting disc 401 during the rotation of the sprocket wheel assembly 100, but is constrained to take the picture counting disc 401 with it during the circular movement of the eccentric pin 114.

Since, in the embodiment shown, the film sprocket wheel 101 which engages in the edge perforation of the film is designed in relation to its circumference so that it performs a rotation through 180° in each case while the film is being wound on by one frame, the spindle end 113 of the sprocket wheel assembly 100, which spindle end is also joined to the film sprocket wheel 101 and carries the eccentric pin 114, rotates in each case through 180° around its central axis for every frame.

The displacement of the picture counting disc 401 by the eccentric pin 114 of the sprocket wheel assembly 100 with the embodiment of the detent teeth 413, 414 is explained in greater detail below, and specifically by way of example in the phases in which, during the winding-on of the film by two consecutive frames, the picture counting disc 401 is displaced from picture number 14 via picture number 13 to picture number 12.

FIG. 27(a) shows the state in which the counting mark with the designation "14" of the picture counting disc 401 is visible through the viewing window 415, as a result of which it is indicated to the camera user that the film contained in the camera is assuming a winding state from which 14 pictures can still be taken on the film before its capacity is exhausted. In this position of the picture counting disc 401, therefore, only one counting mark 411 of the inner counting mark circle 409 is visible in the viewing window 415, but no counting mark 412 of the outer counting mark circle 410 is visible.

If, therefore, a picture having the number 14 in the downward counting mode is taken on the film by the camera user, the camera user actuates the film winding wheel 9 before the next photograph in order to wind the film into the position for recording a picture having the number 13 in the downward counting mode, under which circumstances the picture counting disc 401 is displaced into a position for indicating the counting mark assigned to this picture number. This takes place as follows.

During the winding-on of the film from the position of taking the picture having the number 14 in the downward counting mode by one frame to the position for taking a picture having the number 13 in the downward counting mode, the film sprocket wheel 101 engaging in the film perforation rotates the 180° counterclockwise with the spindle end 113 and the eccentric pin 114 disposed on the end face thereof in accordance with the consecutive views in FIGS. 27(a) to 27(d). In this process, the picture counting disc 401, which, in the position in accordance with FIG. 27(a) is engaged with the first detent tooth 413, but is free from the opposite second detent tooth 414, is displaced, because of the locking and supporting action of the first detent tooth 413 clockwise by a small angular amount in a displacement movement upwards to the right and in a superimposed rotational movement in the substep from FIG. 27(a) to FIG. 27(b), in which process the rotational movement is due to the fact that the picture counting disc 401 is swivelled clockwise by the eccentric pin 114 around a supporting point formed by the first detent tooth 413.

In this sliding and swivelling movement, the first detent tooth 413 gradually releases the notch 406 which is situated near the counting mark "14" and which it initially engages and the second detent tooth 414 gradually engages with the notch near the approximately diametrically opposite counting mark having the number "26".

This process continues during the transition from the position in accordance with FIG. 27(b) to the position in accordance with FIG. 27(c), in which process the picture counting disc 401 is displaced further upwards by the eccentric pin 114 traversing a circular path of 180°, so that, on the one hand, the first detent tooth 413 fully releases the notch near the counting mark "14" and, on the other hand, the second detent tooth 414 plunges more deeply into the notch near the counting mark "26". This process of transferring the picture counting disc 401 from the first detent tooth 413 to the second detent tooth 414 corresponding to winding the film on by one frame is complete since the described 180° rotation of the sprocket wheel assembly group 100 is complete and the picture counting disc 401 has consequently been rotated clockwise by the eccentric pin 114 and displaced upwards to such an extent that the picture counting disc 401 has reached the position in accordance with FIG. 27(d). The first detent tooth is then situated opposite that tooth 407 of the toothed rim 408 of the picture counting disc 401 which is angularly situated between the counting marks "14" and "12", while the second detent tooth 414 has plunged completely into the notch near the counting mark "26". The resultant displacement movement which the picture counting disc 401 executes during the transition from the position in accordance with FIG. 27(a) to the position in accordance with FIG. 27(d) corresponds to the value, determined in length units, of the maximum possible displacement of the picture counting disc 401. In the position of the picture counting disc 401 in accordance with FIG. 27(d), not only the two counting marks "14" and "12" of the inner counting mark circle, but also the punctiform counting mark of the outer counting mark circle situated angularly between said two counting marks are visible in the viewing window 115. As a result of this indication in the viewing window 415, the observer can recognize that the counting mark point angularly situated between the two counting marks "14" and "12" and recognizable in the viewing window 415 marks the counter position "13" and consequently indicates the picture number "13". This indicates to the viewer that 13 pictures can still be taken and the film is ready in a position for taking the picture having picture number 13 in downward counting.

If, after taking a picture having the number 13 in downward counting, the film is wound on from the position in which a picture having the number 13 in the downward counting mode was taken by a further frame to the position for taking a picture having the number 12 in the downward counting mode, the film sprocket wheel 101 with the spindle end 113, which film sprocket wheel engages in the film perforation, rotates a further 180°, for which reason the eccentric pin 114 executes a further clockwise circular movement through 180° in accordance with the consecutive views in FIGS. 27(d) to 27(h).

In this process, the picture counting disc 401, which, in the position in accordance with FIG. 27(d) is engaged with the second detent tooth 414, but is free from the opposite first detent tooth 413, is displaced, because of the locking and supporting action of the second detent tooth 414, downwards to the left in a displacement movement and through a small angular amount in a superimposed clockwise rotary movement by the eccentric pin 114 in the substep from FIG. 27(d) to FIG. 27(e), in which process the rotary movement is due to the fact that the counting mark disc 401 is swivelled by the eccentric pin 114 anticlockwise around a supporting point formed by the tip of the second detent tooth 414.

In this sliding and swivelling movement of the picture counting disc 401, the second detent tooth 414 gradually releases the notch which is situated near the counting mark "26" and in which it is engaged and the first detent tooth 413 gradually engages with the picture counting disc 401, but in this case with the notch near the counting mark "12".

This process continues in the transition from the position in accordance with FIG. 27(e) into the positions in accordance with FIGS. 27(f) and 27(g), in which process the picture counting disc 401 is displaced further downwards by the eccentric pin 114 so that, on the one hand, the second detent tooth 414 completely releases the notch near the counting mark "26" and, on the other hand, the first detent tooth 413 plunges deeper into the notch near the counting mark "12". This process of transferring the picture counting disc 401 from the second detent tooth 414 to the first detent tooth 413 in accordance with winding the film on again by one frame is complete once the sprocket wheel assembly 100 has completed the above-mentioned further rotation through 180° and the picture counting disc 401 has been rotated clockwise by the eccentric pin 114 and displaced downwards to such an extent that the picture counting disc 401 has reached the position in accordance with FIG. 27(h). The second detent tooth 414 is then situated opposite that tooth 407 of the tooth rim 408 of the picture counting disc 401 which is angularly situated between the counting marks "26" and "24", while the first detent tooth 413 has plunged completely into the notch near the counting mark "12".

In this position of the picture counting disc 401, only the counting mark "12" of the inner counting mark circle 409 is visible in the viewing window 415. This indicates to the observer that 12 pictures can still be taken and the film is ready in a position for taking the picture having the number 12 in downward counting.

The switching process described above from the indication of the counting mark "14" to the indication of the punctiform counting mark which is angularly situated between the counting marks "14" and "12" and which is assigned to the picture number "13", corresponding to winding the film on by one frame and also the subsequent switching operation from the indication of said counting mark to the indication of the counting mark "12" corresponding to winding the film on by a further frame having also already taken place in an analogous way during the preceding film winding processes, not described above in greater detail, by two consecutive frames in each case and are repeated in the subsequent film winding processes by two further consecutive frames in each case until the last of the pictures provided as a maximum has been taken and the blank film arrow shaped symbol of the inner counting mark circle 409 appears in the viewing window 115.

In this setting, the picture counting disc 401 can be locked against further rotation if film winding is continued, for which purpose either a friction clutch, not shown in further detail, or a spring extension can be provided in the force transmission path between the film sprocket wheel 101 and the picture counting disc 401, as is explained in still greater detail in the course of the description of a further embodiment.

When the film is wound on by two consecutive frames in each case, the picture counting disc 401 consequently executes a tumbler movement which comprises a single to and fro movement between the detent teeth 413, 414 and a rotational movement superimposed thereon through the angular width of one tooth 407 of the tooth rim 408 of the picture counting disc 401, in which process the counting marks under the viewing window 15 consecutively traverse in the manner described above during the repetitive tumbler movements of the picture counting disc 401 when the film is wound on by consecutive frames in each case. In the embodiment shown, the rotation, resulting from the tumbler movements, of the picture counting disc 401 proceeds in the opposite direction to the rotation of the film sprocket wheel 101.

As has already been mentioned above, every time a picture has been taken on the film, the film sprocket wheel 101 which is engaged with the edge perforation of the film and rotated by the film when it is wound on by one frame executes a rotational movement through 180°, in which process the picture counting disc 401, which is coupled in shape-locked manner to the film sprocket wheel 101 is rotated through an angular amount of approximately 12.9° around its centre in the design described above for the indication of an aggregate of 28 counting marks in total for 27 pictures and an additional blank picture every time the film is wound on. Consequently, a reduction ratio of approximately 14:1 is achieved between the film sprocket wheel 101 and the picture counting disc 401.

The picture counting device 400 described consequently manages without a pawl mechanism between film sprocket wheel 101 and picture counting disc 401. Despite the shape locking between the film sprocket wheel 101 and the picture counting disc 401, no gear or belt reduction mechanism has to be provided between the film sprocket wheel 101 and the picture counting disc 401 either. In addition, the counting device 400 according to the invention has the advantage of an extremely shallow and consequently extremely space-saving structure and can be assembled in a simple plug-in procedure, which also favours an automatic assembly of the picture counting device and the other components, interacting with it, of the camera.

If, as a departure from the exemplary embodiment described above, the camera is so designed that the maximum number of pictures to be taken (including one or more blank pictures) per film is greater or less than 28 objects to be counted, the number of notches 406 and the teeth 407, situated in between, of the tooth rim 408 of the picture counting disc 401 have to be adapted in such a way that the number of said notches 406 and the teeth 407 situated in between corresponds in each case to half said maximum number of objects to be counted. As a result, the reduction ratio during the rotation of the picture counting disc 401 changes accordingly as a function of the rotation of the film sprocket wheel 101.

In a picture counting device for counting a number of pictures differing from the maximum number of 28 pictures (including blank pictures) and with a corresponding adaptation of the number of notches 406 and teeth 407 on the picture counting disc 401, the case may also occur that the two detent teeth 413, 414 are disposed precisely diametrically opposite and/or, when one of the two detent teeth 413, 414 is fully engaged in a notch 406 of the picture counting disc 401, the respective other detent tooth is not situated opposite a tooth of the toothed rim, but opposite a notch in the picture counting disc 401, but without engaging in said notch in this switching state.

These adaptations also apply analogously to the exemplary embodiments described below.

Whereas, in the embodiment in accordance with FIGS. 25 to 27, the notches 406 with the teeth 407 formed in between on the picture counting disc 401 are disposed in the plane of the counting marks, in accordance with further embodiments, which are shown in FIGS. 28 to 31, the arrangement may also be made so that only the inner and outer counting marks situated on the two counting mark circles 409, 410 are disposed on the upwardly directed face 404 of the picture counting disc 401, whereas the notches 406 with the teeth 407, formed in between, of the tooth rim 408 on the picture counting disc 401 are formed only on the lower face 405 of the latter. This has the advantage that the upper face 404, visible for each section through the viewing window 115, of the picture counting disc 401 forms a closed circular face with a smooth circumferential rim and the notches 406 disposed on the lower face 405 of the picture counting disc 401 are thereby camouflaged and do not become visible through the viewing window 115 when the picture counting disc 401 is displaced, which contributes to the clarity of the view of the counting marks in the viewing window 115 when viewed by the camera user. In this case, the detent teeth 413, 414, which alternately engage in the notches 406 are so deeply disposed in the bearing recess 403 that an upper layer of the picture counting disc 401, which forms the upper face 404 can slide away over the detent teeth 413, 414.

Instead of two detent teeth 413, 414 in accordance with the embodiment described above, three or more detent teeth can also be provided at the circumference of the bearing recess 403 for interaction with the toothed rim 408 of the picture counting disc 401.

It is also possible, to provide, instead of the detent teeth 413, 414 and the notches 406, interacting with them, of the picture counting disc 401, differently formed latching devices or detent devices which alternately detain the picture counting disc 401 at approximately opposite latching points or detent points in such a way that, during the rotation of the sprocket wheel assembly 100, a rotation of the picture counting disc 401 takes place alternatively around said latching points or detent points in a manner similar to that in the exemplary embodiment which is described with reference to FIGS. 25 to 27 and in which the picture counting disc 401 is alternately rotated around the one or the other of the detent teeth 413, 414.

Figure 30:
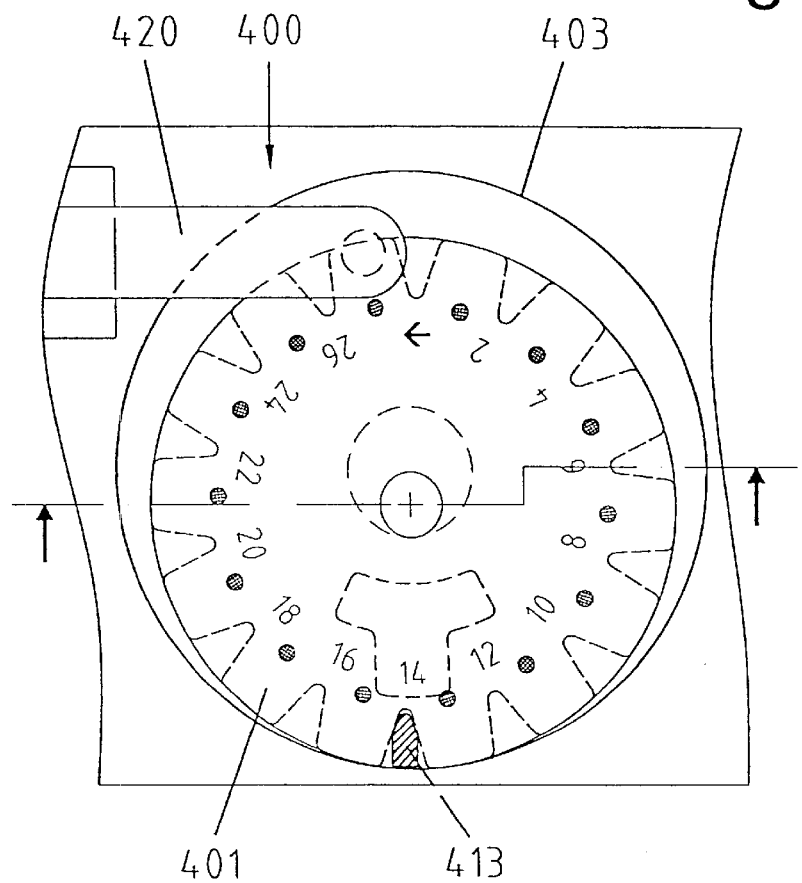
FIG. 30 shows a further embodiment of a picture counting device as a modification of the picture counting device in accordance with FIG. 25.
Figure 31:
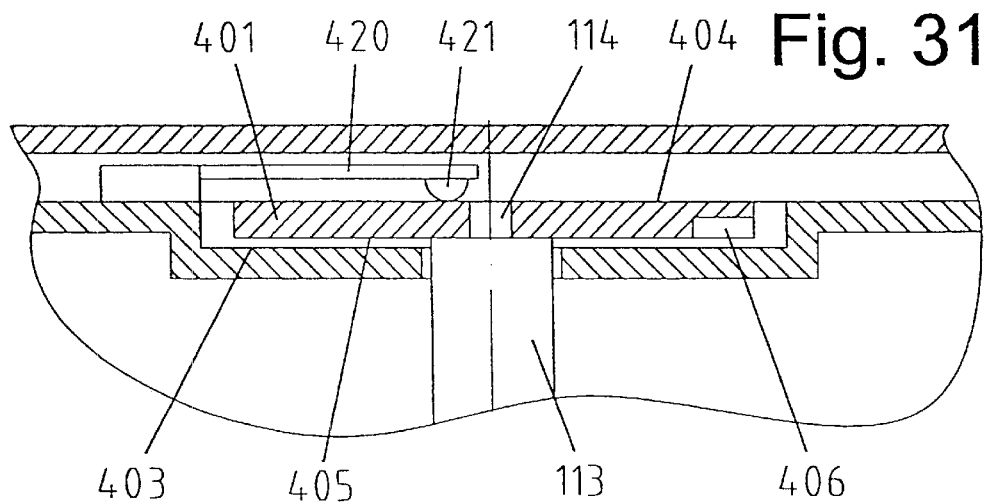
FIG. 31 shows the subject matter of FIG. 30 in a section along a sectioning line shown in FIG. 30.

For example, in accordance with a further embodiment of the invention, the second detent tooth 414 can be replaced by a clamping device which operates in a direction parallel to the axis of rotation of the film sprocket wheel 101 and which, in accordance with FIGS. 30 and 31, comprises a single-arm spring lever 420 attached to a casing section of the core assembly 2 and a dome 421 which is provided at the free end of the latter and which is pressed against the upper face 404 of the picture counting disc 401 under the action of a spring pretensioning of the spring lever 420. The picture counting disc 401 can be slid and rotated with friction under the support point of the dome 421 in the same way as is described in detail in FIGS. 27(*a*) to 27(*h*). As a departure from this, the clamping device 420, 421 can also be formed by latches.

Figure 32:
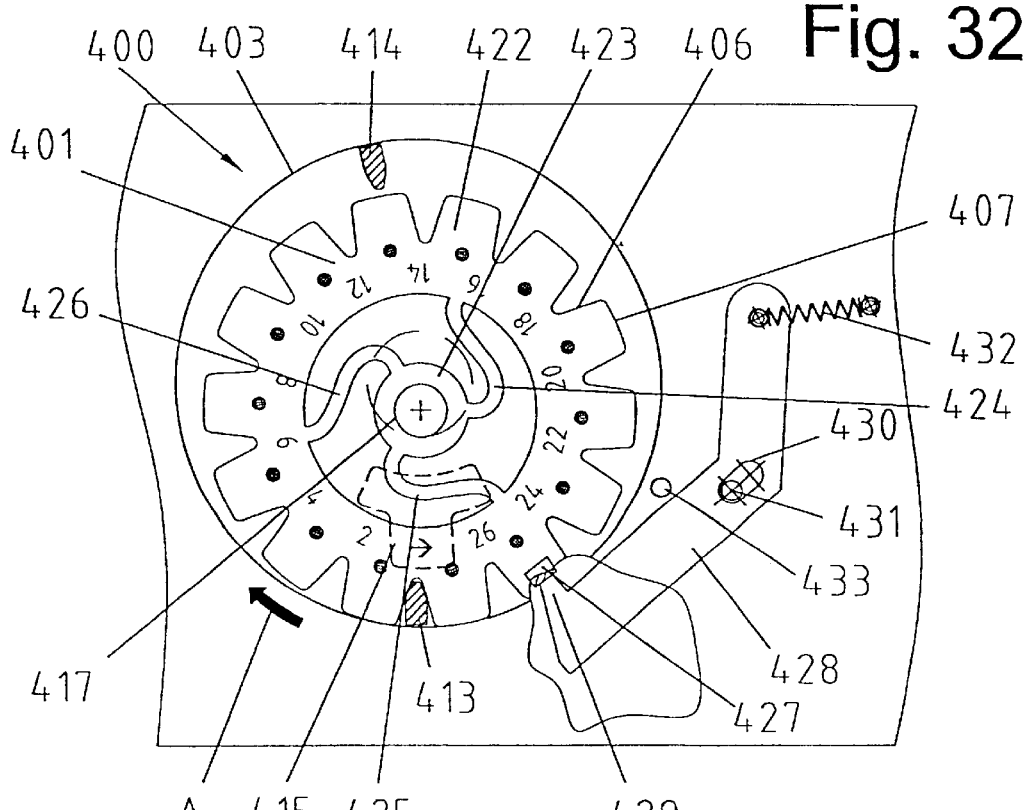
FIG. 32 shows a further embodiment of a picture counting device as a modification of the picture counting device in accordance with FIG. 25 showing the picture counting disc in a starting position.
Figure 33:
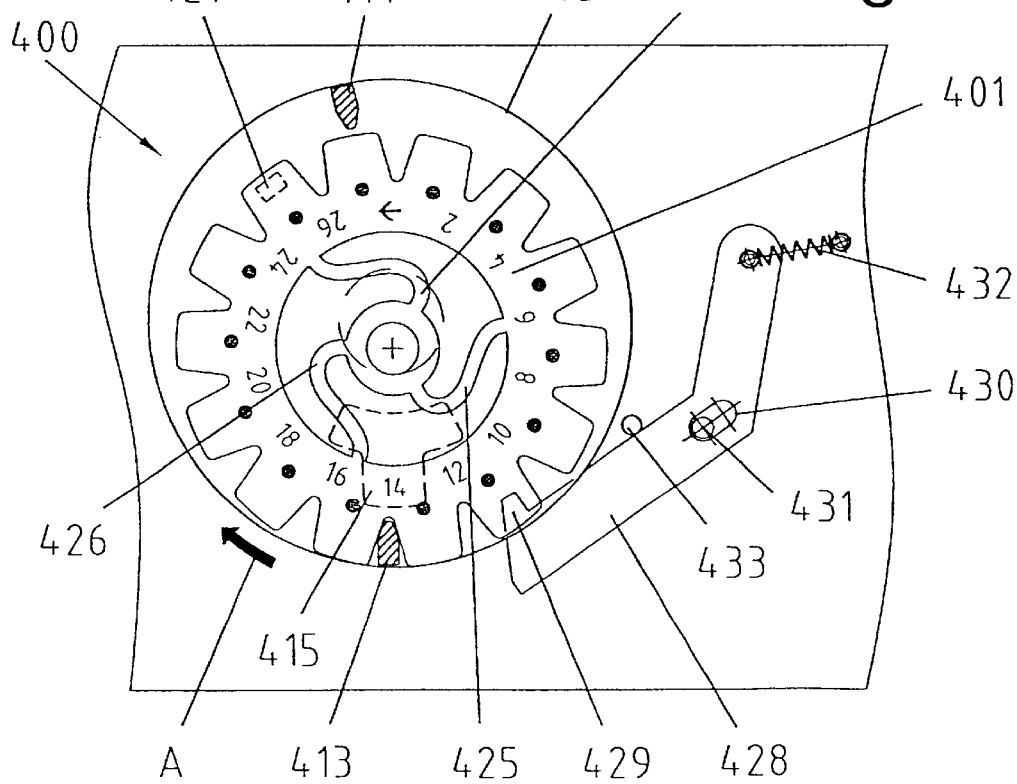
FIG. 33 shows the subject matter of FIG. 32 showing the picture counting disc in a further position.
Figure 34:
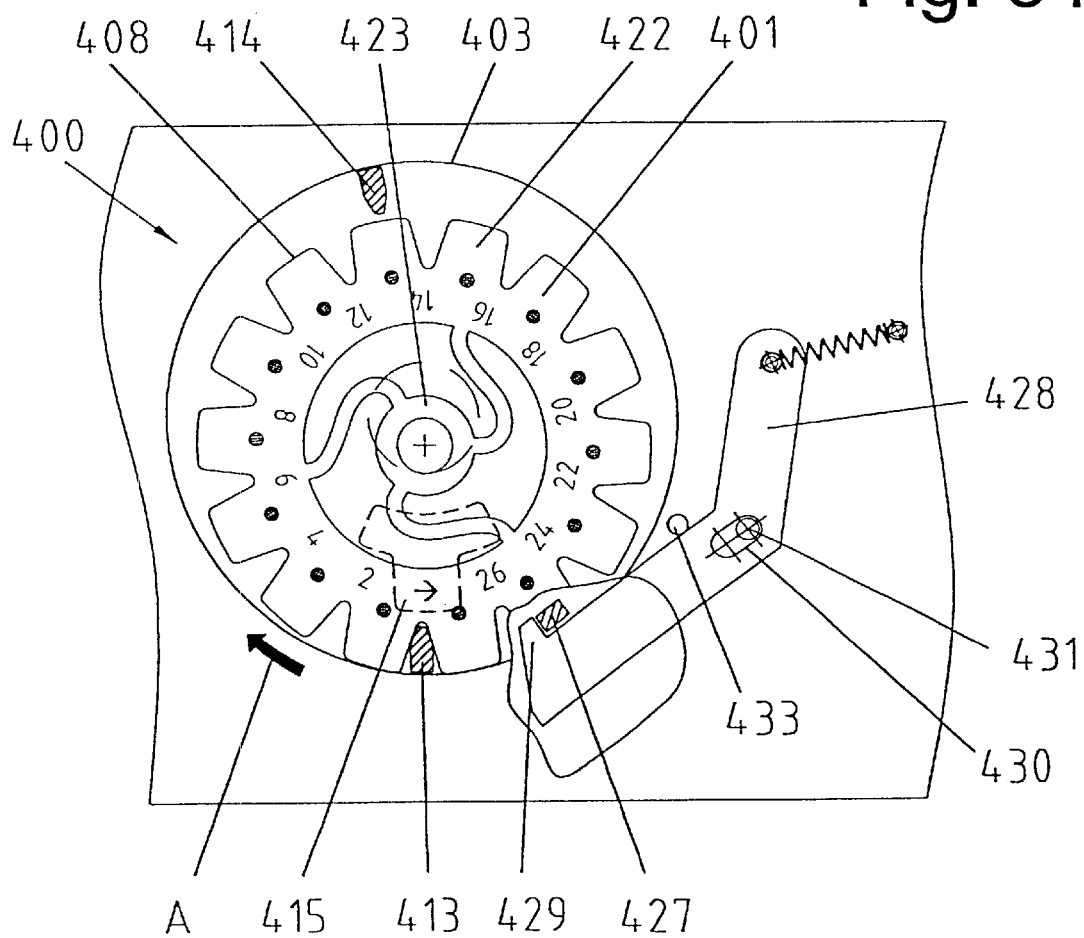
FIG. 34 shows the subject matter of FIG. 32 showing the picture counting disc in a final position.
Figure 35:
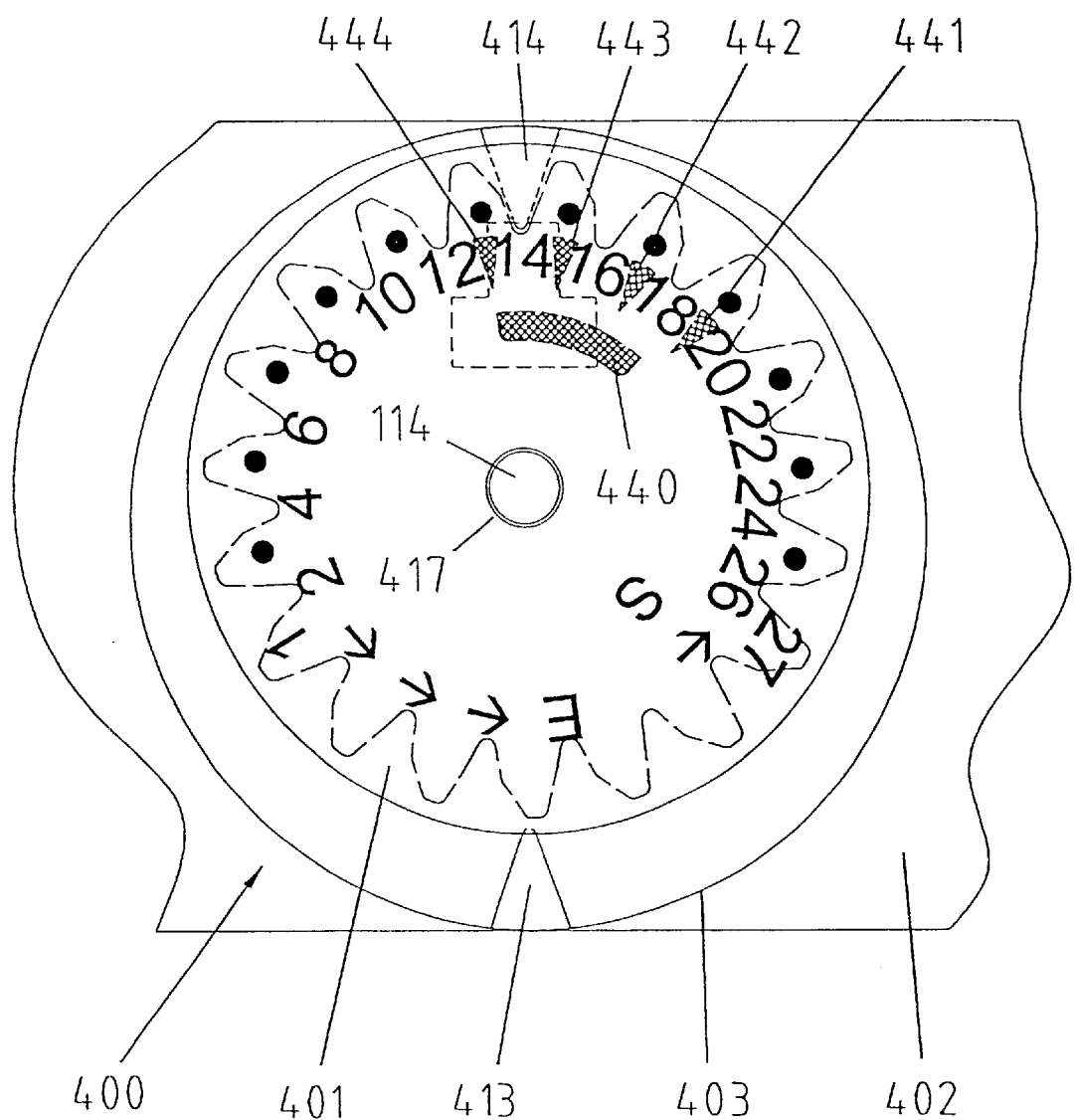
FIG. 35 shows a further embodiment of a picture counting device as a further modification and development of the picture counting device in accordance with FIG. 25.

A further embodiment of the picture counting device according to the invention is shown in FIGS. 32 to 34. In this embodiment, the picture counting disc 401 is divided into an outer ring region 422 and an inner ring region 423. The outer ring region 422 has notches 406 and 407 of the toothed rim 408 and also inner and outer counting marks corresponding to FIGS. 25 to 28. The inner ring region 423 accommodates the central opening 417 of the picture counting disc 401. The outer and inner ring regions 422, 423 are joined together by, for example, three elastic linking elements 424, 425, 426, it being possible for the two ring regions 422, 423 and the elastic linking elements 424, 425, 426 to be formed integrally from plastics material.

The elastic linking elements 424, 425, 426 have the effect that, after the maximum possible number of pictures has been taken, the picture counting disc 401 can be locked against further rotation after reaching a corresponding final position by a counting disc locking device, although, during the subsequent pulling of the film trailer into the film cassette provided in the camera, the film sprocket wheel 101 is rotated further and, consequently, the eccentric pin 114 also rotates further. The movement of the latter and a rotational movement, brought about thereby, of the inner ring region of the picture counting disc 401 is absorbed by a corresponding deformation of the elastic linking elements 424, 425, 426 and is therefore not transmitted to the outer ring region of the picture counting disc 401.

The picture counting disc locking device and its mode of operation are described in greater detail below.

On its lower face 405, the picture counting disc 401 has an axially projecting stop 427. Furthermore, the counting disc locking device comprises a locking lever 428 with an end pawl 429 and an elongated hole 430 in which a bearing pin 431 fixed to the casing engages so that the locking lever 428 can be rotated around the bearing pin 431 under the action of a tension spring 432 which acts on the other end of the locking lever 428 and is slightly displaceable longitudinally because of the elongated hole 430.

In the present starting position of the picture counting disc 401 in accordance with FIG. 32, in which the "start" and "end" arrow shaped symbol is indicated in the viewing window 115, the locking lever 428 with its pawl 429 rests radially against the stop 427 of the picture counting disc 401 without locking it against rotation. If the film winding wheel 9 for winding the film from picture to picture is then actuated by the camera user, the picture counting disc 401 rotates clockwise during film winding by two consecutive frames in each case in consecutive movement phases in each case in accordance with FIGS. 27(*a*) and 27(*h*) as is illustrated in FIGS. 32 to 34 by an arrow A disposed next to the picture counting disc 401. At the same time, the elastic linking elements 424, 425, 426 are just stiff enough for no relative movement between the inner ring region 421 and outer ring region 420 of the picture counting disc 401 to take place in these movement phases.

Shortly after the picture counting disc 401 has left the "start" position, the locking lever 428 with its pawl 429 slides off the stop 427 of the picture counting disc 401 and rotates slightly clockwise around its bearing pin 431 until it rests against a pin 433 which is fixed to the casing. This is evident from FIG. 33, in which the film winding is already so far advanced that the picture counting disc 401 assumes, for example, a position for indicating the picture number "14". If, after further film winding steps, the last photograph of the maximum possible number of photographs has been taken, the picture counting disc 401 reaches the "end" position in accordance with FIG. 34, in which the stop 427 of the picture counting disc 401 comes to rest against the pawl 429 of the locking lever 428 and the latter blocks any further rotation of the picture counting disc 401 as soon as the locking lever 428 has been carried along the length of the elongated hole 430 by the picture counting disc 401. In this position of the picture counting disc 401, the first detent tooth 413 engages in the toothed rim 408 of the picture counting disc 401, while the arrow shaped symbol visible in the viewing window 415 indicates that, as a result of further repeated actuation of the film winding wheel 9 only the trailer of the film can be pulled into the film cassette contained -in the camera. The rotational movement transmitted in this process from the eccentric pin 114 to the inner ring region 423 of the picture counting disc 401 cannot be transmitted to the outer ring region 422 of the picture counting disc 401 as a consequence of its detenting, the resultant relative movements between the inner ring region 423 and the outer ring region 422 of the picture counting disc 401 being taken up by a pulsating movement of the elastic linking elements 424, 425, 426.

A further embodiment of a picture counting device is described in greater detail below with reference to FIGS. 35 to 43. It additionally comprises a control device which is described in greater detail below and with which, after a final picture has been taken on a film loaded into the camera, the locking lever 201 of the winding mechanism locking device 200 of the camera can be switched out of action so that a film trailer, which follows the film section containing the last photograph, can be wound in one go into the film cassette loaded into the camera. For reasons of clarity, in FIGS. 36 to 43, the second lever arm 313 with the parts associated with it has been omitted in representing the release lever 301 of the shutter release device 300 described above although said second lever arm 313 with its associated parts is also present in this embodiment.

Figure 28:
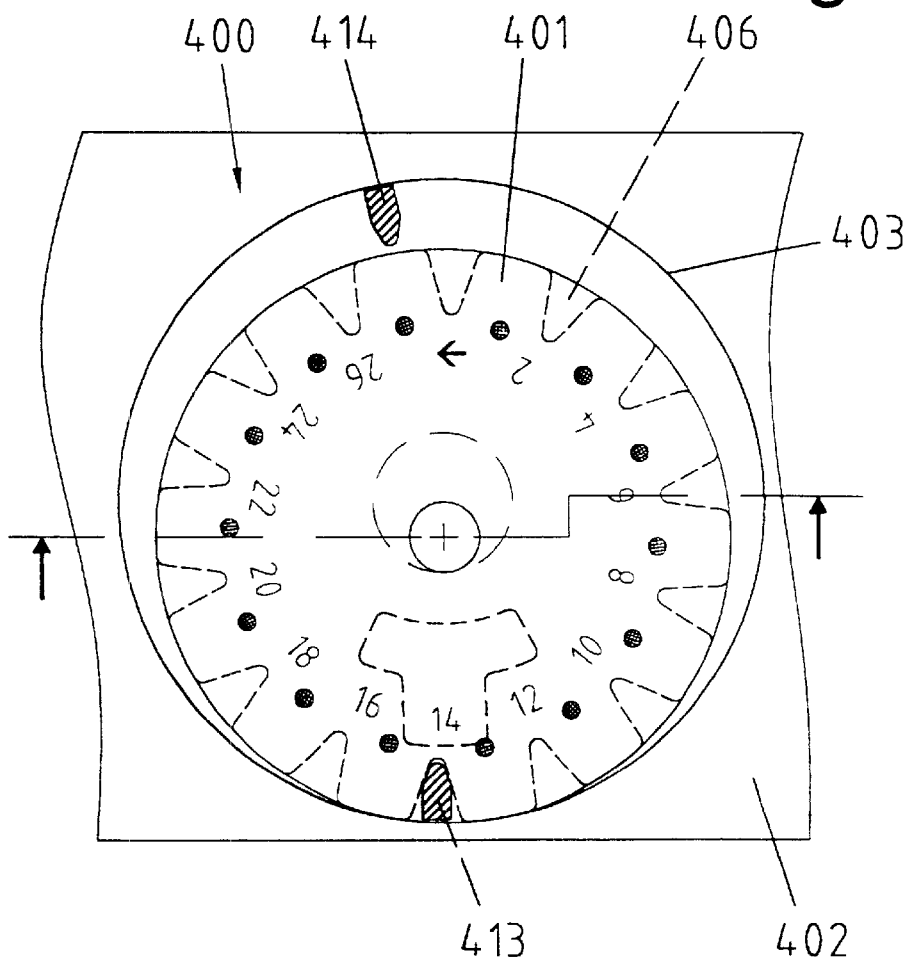
FIG. 28 shows a further embodiment of a picture counting device as a modification of the picture counting device in accordance with FIG. 25.
Figure 29:
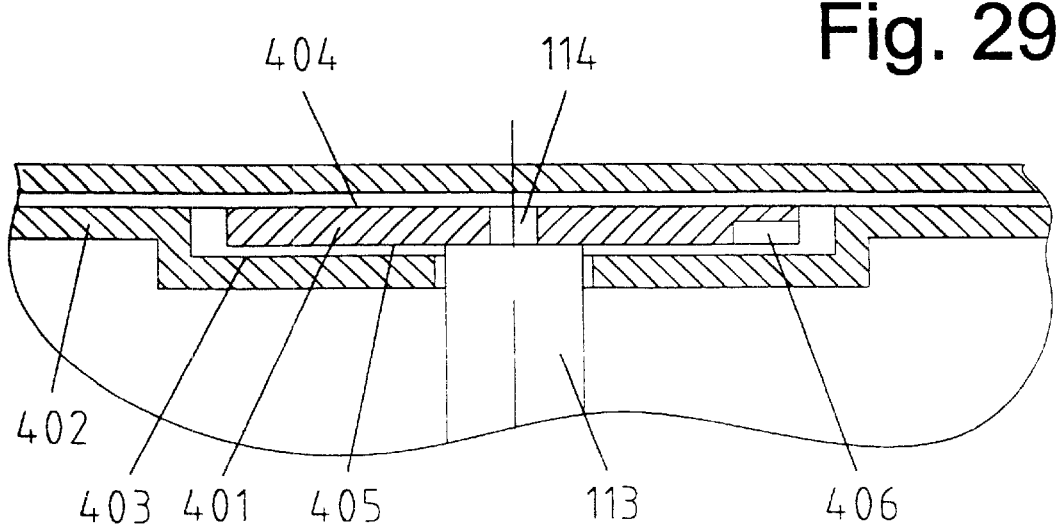
FIG. 29 shows the subject matter of FIG. 28 in a section along the sectioning line shown in FIG. 28.

In said embodiment in accordance with FIGS. 35 to 43, the picture counting device 401 is essentially designed according to the embodiment in accordance with FIGS. 28 and 29 as regards the arrangement of the teeth 407 of the toothed rim 408 on the underside 405 of the picture counting disc 401, but it differs therefrom in that, in the direction of rotation of the picture counting disc 401, three consecutive arrow shaped symbols for indicating a film trailer and an "E" symbol for indicating the end of the film, i.e. for indicating the completion of the winding of the film trailer are provided after the counting mark for picture number 27 on the inner counting mark circle 409. The division of the toothed rim 408 is correspondingly adapted to the additional inclusion of said symbols in the circle of counting marks on the inner counting mark circle 409, i.e. the number of notches 406 has been correspondingly increased with a corresponding reduction in their mutual spacings. Furthermore, a row of blank indexing symbols "®" is situated on the outer counting mark circle 410 between the counting marks for the picture having the number "27" and the counting mark for the picture having the number "1".

The locking lever 201 of the winding mechanism locking device 200 is controlled by the picture counting disc 401 so that it is prevented from falling into the grooves 111, 112 of the grooved disc as the sprocket wheel assembly 100 is rotated and is consequently rendered inoperative if, and for as long as, the indicating symbols "®" and "E" which follow the counting mark indicating picture number 1 appear in the viewing window when the film is wound the length of its film trailer by the continued actuation of the film winding wheel 9.

For this purpose, the film counting disc 401 has the above-mentioned control or blocking device which, in the embodiment shown, is formed by an elongated curved control or blocking stop 440 being disposed on the underside 405 of the counting disc 401 along an inner control circle and four wedge-shaped control or blocking stops 441, 442, 443, 444 which have a uniform mutual spacing being disposed on an outer control circle. Said control stops 440, 441, 442, 443, 444 are each shown double-hatched in FIGS. 35 to 45 for improved recognizability. The two above-mentioned control circles are concentric with the centre of the picture counting disc 401. The mutual spacing of said two control circles is exactly as great as the mutual spacing of the inner counting mark circle 409 and of the outer counting mark circle 410 on the picture counting disc 401. As FIG. 37 and subsequent figures show, the above-mentioned control stops 440, 441, 442, 443, 444 each project downwards in the axial direction from the underside 405 of the picture counting disc 401 and are therefore not visible to the observer from the top. The length of the arc-shaped control stop 440 and the number of wedge-shaped control stops 441, 442, 443, 444 correspond to the length of the film trailer. The longer the film trailer is, the longer is the arc-shaped control stop 440 and the higher is the number of wedge-shaped control stops 441, 442, 443, 444.

Furthermore, in the embodiment in accordance with FIGS. 35 to 43, the locking lever 201 has, in the vicinity of its first locking pawl 205, a spike 210 which projects upwards parallel to the axis of rotation 203 of the locking lever and which, with its free end, can come into contact alternately with each one of the control stops 440, 441, 442, 443, 444 of the picture counting disc 401 as the locking lever 201 is rotated clockwise around the axis of rotation 203.

Figure 36:
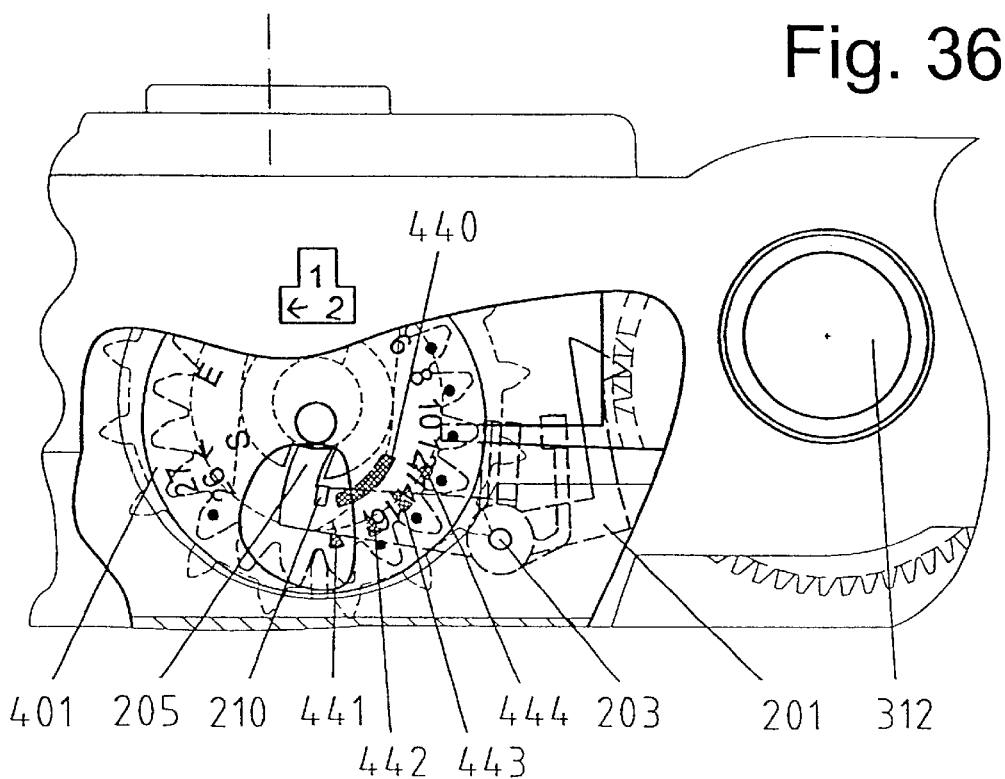
FIG. 36 shows parts of a camera having the picture counting device in accordance with FIG. 35 in the setting for indicating the picture number for a final photograph of a sequence of photographs in a functional state prior to taking said final photograph and with a winding mechanism locking device in the setting for locking the film winding mechanism.
Figure 37:
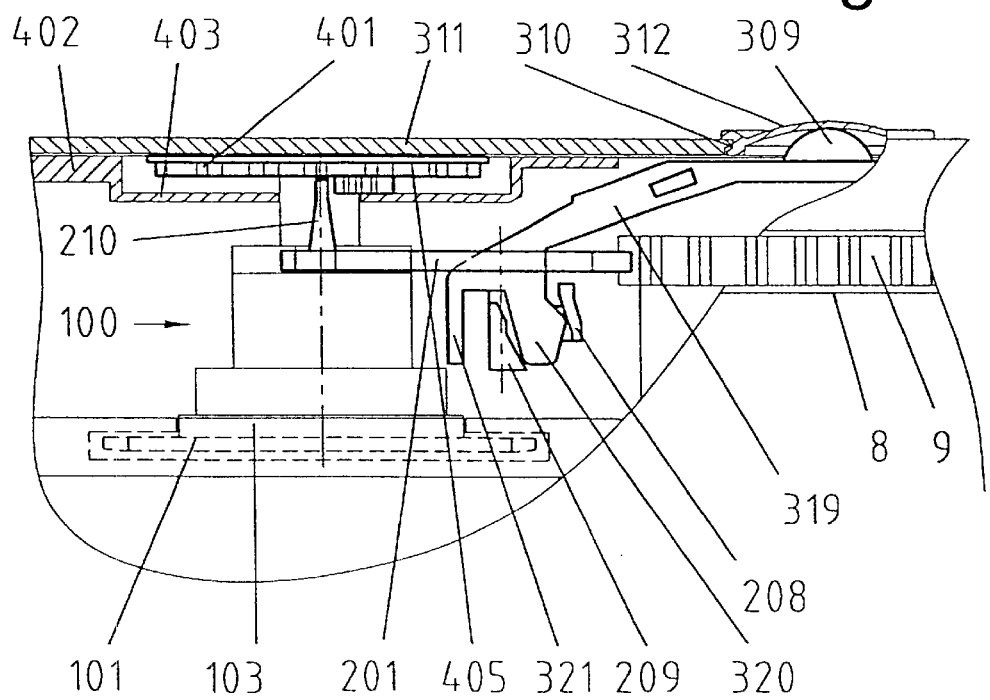
FIG. 37 shows the subject matter of FIG. 36, partly in section, partly in rear elevation.
Figure 38:
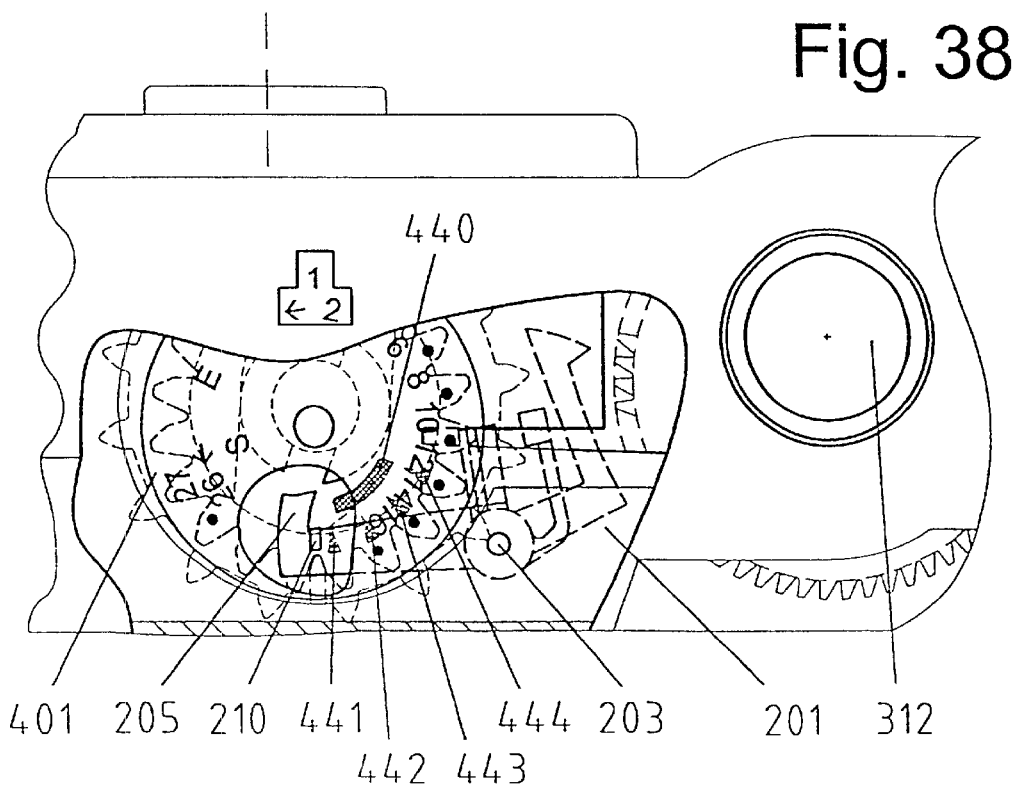
FIG. 38 shows the subject matter of FIG. 36 after unlocking the film winding mechanism.
Figure 39:
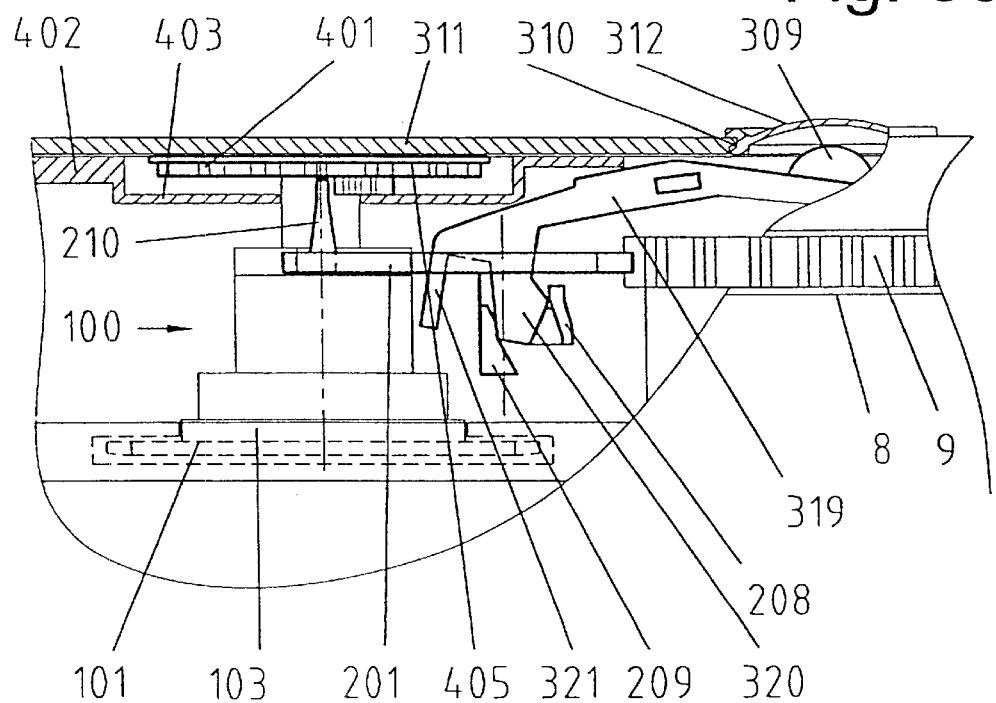
FIG. 39 shows the subject matter of FIG. 38 partly in section, partly in rear elevation.

FIGS. 36 and 37 show the functional state in which the camera is on standby for taking the last picture, i.e. the picture having picture number 1. Accordingly, the locking lever 201 is in the locking position, that is to say engaged with the milling of the film winding wheel 9 and engaged with one of the grooves 111, 112 of the grooved disc 110 of the sprocket wheel assembly 100, while the counting mark having the number "1" is indicated in the viewing window 415. To take the picture having the number "1", the release membrane 312 is actuated, as a result of which the switching element 320 of the third lever arm 319 of the release lever 301 swivels the locking lever 201 anticlockwise around its axis 203 so that it reaches the position in accordance with FIGS. 38 and 39. As a result, the film winding wheel 9 and the grooved disc 110 of the sprocket wheel assembly 100 are again released by the locking lever 201.

Figure 40:
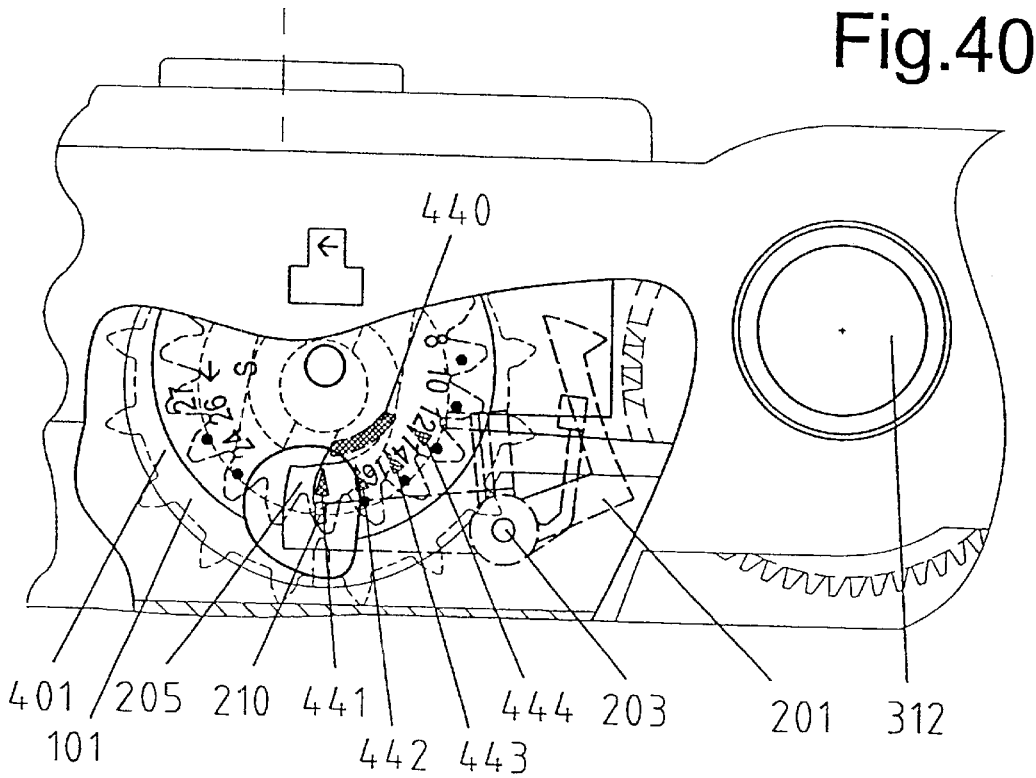
FIG. 40 shows the subject matter of FIG. 36, partly in section, partly in rear elevation, after carrying out a further switching step during the advance of the film.
Figure 41:
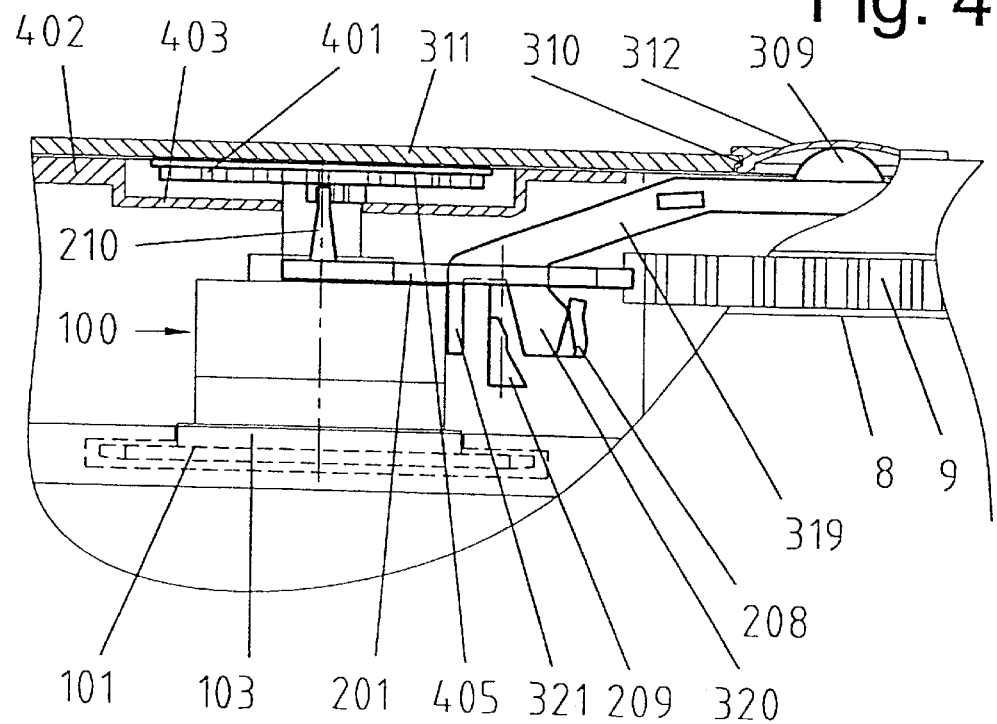
FIG. 41 shows the subject matter of FIG. 40 in section.

If the film winding wheel 9 is now indexed further by the camera user, the picture counting disc 401 reaches, after a rotation of the film sprocket wheel 101 through 180°, the position in accordance with FIGS. 40 and 41, in which the first of the blank index arrow shaped symbols following the counting mark "1" is indicated in the viewing window 415 and, as a result of the rotational and displacement movement of the picture counting disc 401 in accordance with FIGS. 27(*a*) to 27(*d*), the first of the stops 441, 442, 443, 444 of the outer control ring is situated opposite the spike 210 of the locking lever 201, as is shown in FIGS. 40 and 41. Under these conditions, the picture counting disc 401 has assumed a position in which it is released by the first detent tooth 413 and is seized by the second detent tooth 414. As a result of the blocking action of the above-mentioned control stop 441 of the picture counting disc 401, the locking lever 201 cannot engage in the available groove 111 or 112 of the grooved disc 110 despite the action of the spring tension which has been built up in the third lever arm 208 of the locking lever 201, so that locking of the film winding wheel 9 of the film winding device by the locking lever 201 does not occur.

Figure 42:
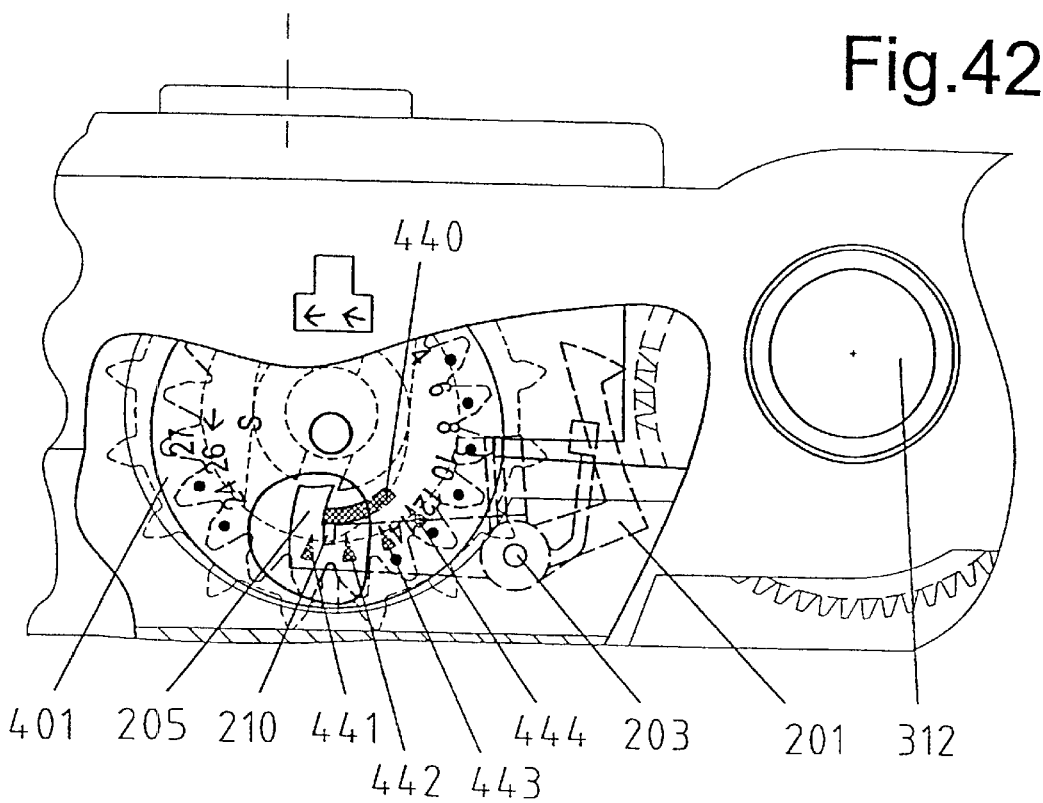
FIG. 42 shows the subject matter of FIG. 40, partly in section, partly in rear elevation, after carrying out a further switching step in the advance of the film.
Figure 43:
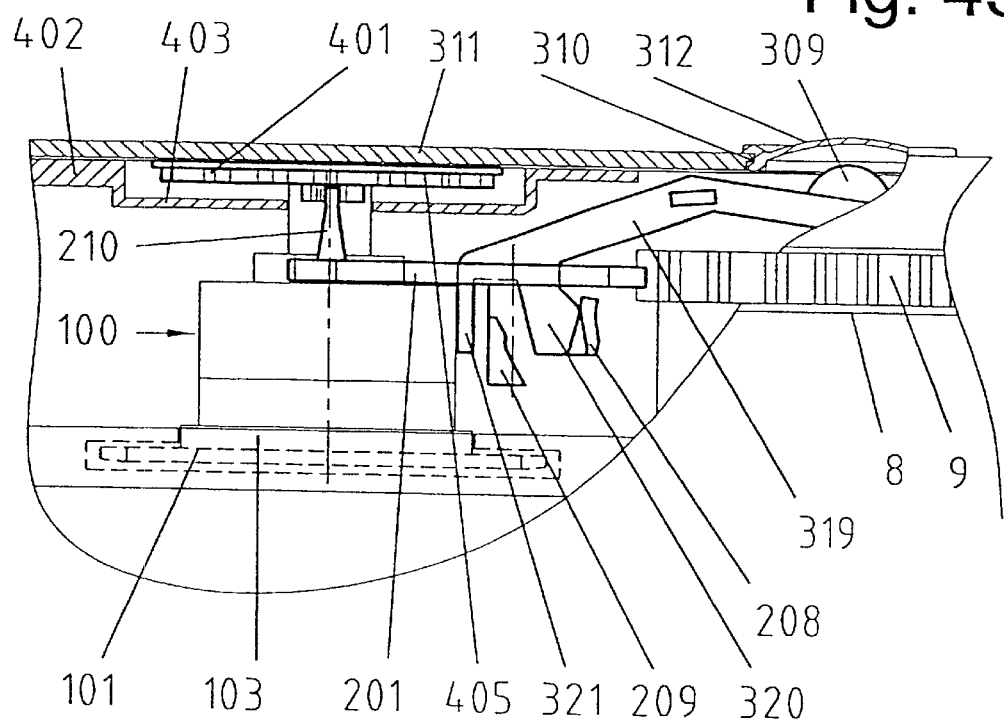
FIG. 43 shows the subject matter of FIG. 42 in section.

The camera user can therefore actuate the film winding wheel 9 further in accordance with the indication which he receives as a result of the indicating arrow shaped symbol in the viewing window 415 and consequently continue the film winding, under which circumstances the film trailer traverses the exposure station in the camera. If, under these circumstances, the film sprocket wheel 101 carried along by the film completes a further rotation through 180°, the picture counting disc 401 has reached, in its rotational and sliding movement in accordance with FIG. 27(*e*) to 27(*h*), the position in accordance with FIGS. 27(*h*) or 27(*a*), in which it has again been released from the second detent tooth 414, but is again seized by the first detent tooth 413. Although, under these circumstances, the first control stop 441 of the outer control circle of the picture counting disc 401 has released the spike 210 of the locking lever 201 so that the spike 210 has been able to engage in the gap between the first control stop 441 and the second control stop 442 of the outer control circle of the picture counting device 401, it now encounters the arc-shaped inner control stop 440 of the picture counting disc 401, as is shown in FIGS. 42 and 43. Because of the transverse displacement of the picture counting disc 401 which has taken place, the locking lever 201 assumes under these circumstances the same angular position in relation to its axis of rotation 403 which it already had in the preceding sequence phase when it was resting against the first control stop 441 of the outer control circle. Consequently, the locking lever 201 is again prevented from engaging in a groove, again available, of the grooves 111, 112 of the grooved disc 110 and thereby from locking the film winding wheel 9. The film winding therefore continues to remain unlocked, the first and second of the indicating arrow shaped symbols of the outer counting mark circle 409 of the picture counting disc 401 being simultaneously visible in the viewing window 415.

Since the film winding device remains unlocked, the camera user can continue the actuation of the film winding wheel 9, under which circumstances the above-mentioned processes continue in principle, albeit with the provision that now the second control stop 442, the third control stop 443 and the fourth control stop 444 of the outer control circle of the picture counting disc 401 are consecutively opposite one another in the same way as previously the first control stop 441 of said outer control circuit was opposite the spike 210 of the first locking pawl 205 of the locking lever 201 and, in the meantime, the spike 210 of the locking lever 201 encounters other regions in each case of the elongated inner control stop 440 of the picture counting disc 401. At the end of these repetitive processes, the "end" symbol "E" of the picture counting disc 401 appears in the viewing window 415 and indicates to the user that the film winding is complete and the film trailer has also been pulled completely into the film cassette, not shown, disposed in the camera.

The camera, which is preferably designed for disposable use, can now be given by the user to a developing and copying establishment in which the film cassette with the exposed film is removed from the camera and the exposed film contained therein is processed further by the development copying establishment in accordance with the order placed by the user, while the camera is disposed of or submitted for re-use.

The outer control stops 441, 442, 443 and 444 and also the inner arc-shaped control stop 440 on the underside 405 of the picture counting disc 401 are therefore a control device which serves to render inoperative the locking lever 201 of the winding mechanism locking device 200 of the camera during the rotation of the picture counting disc 401 within a certain angular region so that the film winding wheel 9 of the film winding device of the camera remains continuously unlocked during the winding of the film trailer through the exposure station of the camera. Said control device acts from the picture counting disc 401 and, because of the tumbling to and fro movement of the picture counting disc 401 along the base of the bearing recess 403, it has two control regions 440 and 441, 442, 443, 444 which are mutually displaced in the radial direction in accordance with this to and fro movement of the picture counting disc 401 and alternatively become functional in conformity with said to and fro movement.

In the picture counting device 400 described above, the counting marks on the picture counting disc 401 may also be disposed so that, instead of a picture counting in decreasing numerical sequence, a picture counting takes place in increasing numerical sequence.

Since the picture counting disc 401 is not detented at the end of a complete counting process in the embodiment described last, after counting in a certain numerical sequence, it is possible to switch over without transition to a counting sequence in the opposite direction, which may be advantageous during the winding or rewinding of a film in the camera when it is fitted prior to the framewise exposure or after completion of the framewise exposure of the film.

If, as a departure from the embodiments shown, odd numbers are provided as outer counting marks instead of the punctiform outer counting marks of the outer counting mark circle 410, the viewing window 415 may assume the shape of a rectangle which is elongated in the radial direction or of a circle without a transverse extension of the viewing window 415 corresponding to the horizontal beam of the T-shape shown in the drawings.

The picture counting device described above can also be used if the film sprocket wheel 101 is designed so that, during film winding, it is rotated for each frame not through 180°, but through 360°. In this case, the picture counting disc 401 traverses all the movement phases in accordance with FIGS. 27(*a*) to 27(*h*) consecutively and one after the other while the film is being wound on one frame, for which purpose all the picture marks are disposed in this case on the picture counting disc 401 in a single picture mark circle at a mutual spacing such that, starting from the indication of a picture mark characterizing a certain picture number in the viewing window 415 if the picture counting disc 401 is set in accordance with FIG. 27(a), the picture mark for indicating the picture with the next picture number (in the case of down- ward counting) is indicated in the viewing window 415 if the picture counting disc has reached its setting in accordance with FIG. 27(h). In this case, too, the viewing window 415 can be reduced to a simple rectangular or circular shape. Furthermore, instead of a plurality of control stops 440 to 444, only a single arc-shaped control stop 440 has to be provided in this embodiment in order to form a stop for the spike 210 of the locking lever 201 of the winding mechanism locking device 200 in the region of the film trailer and to prevent the locking lever 201 from engaging in one of the grooves 111, 112 of the grooved disc 110 of the sprocket wheel assembly 100.

Finally, it is also possible in the case of the picture counting device 400 for the picture counting disc 401 carrying the counting marks not to be displaced with respect to the viewing window 415, but, in a kinematic reversal, the picture counting disc carrying the counting marks may be fixed and a carrier comprising the viewing window 415 may rotate around said picture counting disc during the film advance, the viewing window moving across the counting marks of the fixed picture counting disc. In this case, the sprocket wheel assembly 100 does not drive the picture counting disc, but the carrier of the viewing window 415.

Furthermore, deviations from the embodiments shown in the drawings are also possible in that, instead of an eccentric pin 114 on the spindle 113 of the sprocket wheel assembly 100, an eccentric is formed by the picture counting disc 401.

The picture counting device described above may also be used in other photographic appliances and equipment without further recording devices in which a picture counting or other recordings take place.

In addition, the counting device used in the exemplary embodiment described above for picture counting in a camera can also be used for counting consecutive switching, control or other processes within a limited counting range in other equipment, appliances and machines, for example in devices for automatically controlling access to means of transport, function rooms, etc., or in devices for packaging and dispensing objects or substances in a limited number or quantity in each case, especially in those cases in which counting processes are to be carried out in non-stationary applications of such devices regardless of the availability of external energy sources with simple mechanical means. In that case, switching elements other than the locking lever 201 provided in the embodiment in accordance with FIGS. 36 to 43 can also be controlled as a function of predetermined angular settings of the counting disc.

The above embodiments of a picture counting device for a camera are examples of the embodiment of a general teaching. This is that, in a counting device for a camera or for other applications with a counting mark carrier 401 which forms a first assembly and which has a plurality of counting marks disposed in a ring shape and with an indicating device 415 which forms a second assembly and which interacts with counting marks of the counting mark carrier with relative displacement of the two assemblies with respect to one another by a control device 114, the assembly 401, which is displaceable relative to the other assembly, can be rotated and displaced by the control device 114 parallel to a plane of rotation of said displaceable assembly 401. Preferably, the rotatable and displaceable assembly contains the counting mark carrier 401.

The displaceable assembly 401 can be alternately detentable at various regions of its rim and can be alternately rotatable by the control device around said detent regions. In particular, the displaceable assembly 401 may have a ring-shaped outer contour and a detent device may form at least two detent means 413, 414 or 420, 421 which act on the ring-shaped outer contour at various points and between which the displaceable assembly 401 is displaceable parallel to its displacement plane for the purpose of alternate detenting. The detent means of the detent device may alternately detent the displaceable assembly 401. The detent means may comprise at least one detent tooth 413 and the displaceable assembly 401 may have, on its ring-shaped outer contour, a toothed rim 408 with which the at least one detent tooth 413 alternately engages or disengages.

For example, the displaceable assembly 401 may have a viewing face 404 and a face 405 which is opposite the viewing face and on which the tooth rim 408 is disposed, under which circumstances it is concealed by the viewing face 404. The detent device may comprise a further detent tooth 414 which is situated approximately diametrically opposite the first detent tooth 413 with respect to the displaceable assembly 401. In another configuration, the detent device may comprise a clamping device 420, 421 which can detent the displaceable assembly by clamping.

The displaceable assembly can be driven by the control device 114 and rotated and slid under the action of the detent device. The control device 114 may form an eccentric with the displaceable assembly. The displaceable assembly may be disc-shaped.

In a further configuration, the displaceable assembly 401 may comprise two regions 422, 423 which are movable with respect to one another, the detent device acting on the one region 422 and the control device 414 on the other region 423, it being possible for the two regions to be linked to one another in force-locked manner. One or more elastically deformable linking elements 424, 425, 426 may be provided between the two areas 422, 423 of the displaceable assembly 401.

In a further configuration, the displaceable assembly 401 can be blocked in a predetermined position by a locking device 428–433. In a further configuration, the displaceable assembly 401 may comprise stops 440–444 with which a switching device 210 interacts in predetermined positions of the displaceable assembly.

Preferably, counting marks 411, 412, which follow one another in regard to their counting content in a predetermined sequence may be disposed alternately on two concentric circles 409, 410 on the assembly 401 containing the counting mark carrier. The indicating device 415 may be formed by a window which interacts with counting marks of the counting mark carrier and which is disposed and shaped in such a way that it indicates counting marks of the two concentric circles 409, 410. The window of the indicating device 415 can be designed in such a way that, at least in one detent position of the counting mark carrier 401, it extends in a radial direction over the two concentric circles on which counting marks are disposed. In particular, the window of the indicating device 415 may have an approximate T-shape.

For example, the counting mark carrier 401 forms the picture counting disc of a camera. In a camera having a picture counting device of the above type, the displaceable picture counting disc 401 may comprise a control device 440–444 for controlling a winding locking mechanism locking device 200 of the camera, the controlling device 440–444 rendering the winding mechanism locking device 200 inoperative in predetermined positions of the picture counting disc. The control device 440–444 of the picture counting disc 401 may have at least two groups of stops 440 and 441–444 which are alternately operative in accordance with displacement movements of the picture counting disc 401. The groups of stops 440 and 441–444 may form concentric ring sections and be disposed in such a way that stops 441–444 which are disposed on an outer circular arc have a mutual spacing such that a switching element 210 of the winding mechanism locking device 200 or another switching device can reach, with relative displacement between adjacent stops, a stop 440 which is disposed along a concentric inner circular arc.

What is claimed is:

1. An image counting device for a camera, comprising a first assembly including a counting mark carrier (401) having a plurality of counting marks disposed in an annular area of the counting mark carrier;
a second assembly including indicating means (415) interacting with the counting marks of the counting mark carrier of the first assembly; and
moving means (114) for moving one of the first and second assemblies relative to the other one of the assemblies in a predetermined plane, the one assembly which is movable by the moving means thus constituting a movable assembly;
wherein by the moving means the movable assembly is rotatable in one sense and is shiftable alternately in different directions.

2. An image counting device according to claim 1, wherein the movable assembly is the first assembly comprising the counting mark carrier (401).

3. An image counting device according to claim 2, wherein the movable assembly is constructed and arranged so that, when moved by the moving means, is shiftable alternately at least between a first position and a second position and is rotatable at least around a first center of rotation when the assembly is in its first position, and around a second center of rotation when the assembly is in its second position.

4. An image counting device according to claim 1, further comprising engaging means for alternately engaging the movable assembly at a plurality of engagement regions thereof, each region, when engaged by the engaging means, in combination with the engaging means forming a center of rotation of the movable assembly.

5. An image counting device according to claim 4, wherein the engaging means are formed by projection means arranged at different angular positions with regard to a path of rotation of a circumferential portion of the movable assembly and provided for alternately engaging and disengaging recesses at the circumferential portion of the movable assembly.

6. An image counting device according to claim 5, wherein the circumferential portion of the movable assembly and the recesses thereof are formed by a ring-shaped outer contour of the movable assembly, having a toothed rim (408) which is alternately engaged and disengaged by detent means.

7. An image counting device according to claim 5, wherein the projecting means comprises at least first and second detents (413, 414) situated approximately diametrically opposite to each other according to at least first and second positions of the movable assembly which is shiftably movable therebetween, and wherein the at least first and second detents (413, 414), when alternately engaging the movable assembly, act as a center of rotation for the movable assembly when moved by the moving means.

8. An image counting device according to claim 4, wherein the engaging means comprises clamping means (420, 421) for clamping the movable assembly when in its at least first and second positions, respectively.

9. An image counting device according to claim 8, wherein the clamping means (420, 421) resiliently contacts the movable assembly.

10. An image counting device according to claim 4, wherein the movable assembly has a viewing face (404) and an engageable face (405) situated opposite the viewing face for interacting with the engaging means.

11. An image counting device according to claim 4, wherein the movable assembly has two portions (422, 423) linked to each other by linking means (424, 425, 426) so as to be movable relative to each other, and wherein the moving means acts on one portion thereof and the engaging means acts on the other portion thereof.

12. An image counting device according to claim 11, wherein the linking means (424, 425, 426) comprises at least one elastically deformable element provided between the two portions (422, 423) of the movable assembly.

13. An image counting device according to claim 1, further comprising locking means (428–433) for locking the movable assembly in a predetermined position thereof.

14. An image counting device according to claim 1, wherein the movable assembly comprises stops (440–444) interacting with a switching device (210) when the movable assembly is in a predetermined position.

15. An image counting device according to claim 1, wherein the counting marks of the first assembly are arranged to follow one another in regard to their counting content in a predetermined sequence and are alternately disposed on two concentric circles (409, 410).

16. An image counting device according to claim 1, wherein the counting marks of the first assembly are alternately disposed on two concentric circles (409, 410) spaced from one another by a distance corresponding to a distance within the movable assembly is shiftable by the moving means.

17. An image counting device according to claim 1, wherein said indicating means (415) of the second assembly comprises a viewing window extending, at least in one of the at least first and second positions of the movable assembly, in a radial direction over two concentric circles on which the counting marks of the first assembly are disposed.

18. An image counting device according to claim 17, wherein the viewing window of the indicating means (415) is approximately T-shaped.

19. An image counting device according to claim 1, wherein the moving means (114) is coupled to a sprocket wheel (101) rotatable in accordance with transportation of a film accommodated in the camera.

20. An image counting device according to claim 1, wherein the moving means comprises coupling means having a coupling pin (114) projecting into a coupling hole (417) of the movable assembly.

21. An image counting device according to claim 20, wherein the coupling pin (114) of the coupling means of the moving means is rotatable along a circular path (113) having a diameter corresponding to a distance between at least first and second positions of the movable assembly within the movably assembly is shifted when moved by the moving means.

22. An image counting device according to claim 20, wherein the coupling pin (114) is eccentrically disposed on an eccentric member (113) coaxially arranged with and connected to the sprocket wheel (101).

23. A camera including an image counting device according to claim 1.

24. A camera according to claim 23, comprising a film winding mechanism locking device (200) controlled by a control device (440–444) of the image counting device so as to render said film winding mechanism locking device (200) inoperative when the movable assembly of the image counting device is in any of predetermined positions.

25. A camera according to claim 24, wherein the control device (440–444) of the image counting device comprises at least two steps (440, 441–444) alternately operative in accordance with alternate shifting movement of the movable assembly of the image counting device so as to alternately render the film winding mechanism locking device (220) inoperative.

26. A camera according claim 25, wherein the at least two stops (440, 441–444) of the control device of the image counting device comprise a first stop (440) and second stops (441–444), forming concentric ring sections disposed in such a manner that the second stops (441–444) are disposed on a outer circular arc and have a mutual spacing such that a switching element (210) of the film winding mechanism locking device (200) reaches, with relative displacement between adjacent second stops, a first stop (440) disposed along an inner concentric circular arc.

* * * * *